(12) United States Patent
Brown et al.

(10) Patent No.: US 7,414,831 B1
(45) Date of Patent: Aug. 19, 2008

(54) ADJUSTABLE DISPLAY SYSTEM

(75) Inventors: Blake Brown, Sunnyvale, CA (US); Jason Monteiro, San Mateo, CA (US); James L. Fergason, Menlo Park, CA (US)

(73) Assignee: Fergason Patent Properties, LLC, Menlo Park, CA (US)

( * ) Notice: Subject to any disclaimer, the term of this patent is extended or adjusted under 35 U.S.C. 154(b) by 358 days.

(21) Appl. No.: 11/093,343

(22) Filed: Mar. 30, 2005

Related U.S. Application Data

(60) Provisional application No. 60/558,868, filed on Apr. 1, 2004.

(51) Int. Cl.
*H05K 5/00* (2006.01)
*H05K 7/00* (2006.01)
*G02B 1/10* (2006.01)

(52) U.S. Cl. .................. 361/681; 359/583; 248/917

(58) Field of Classification Search ............ 361/681; 248/917–921; 359/583, 578, 580, 584; 356/126, 356/369
See application file for complete search history.

(56) References Cited

U.S. PATENT DOCUMENTS

| | | | |
|---|---|---|---|
| 2,845,618 A | 7/1958 | Huffman | |
| 3,777,059 A | 12/1973 | Wilkey, Jr. | |
| 4,385,806 A | 5/1983 | Fergason | |
| 5,300,942 A | 4/1994 | Dolgoff | |
| 5,416,496 A | 5/1995 | Wood | |
| 5,421,589 A | 6/1995 | Monroe | |
| 5,598,282 A * | 1/1997 | DeGroof | 349/15 |
| 5,644,427 A | 7/1997 | Omori et al. | |
| 5,687,939 A * | 11/1997 | Moscovitch | 248/122.1 |
| 5,717,422 A | 2/1998 | Fergason | |
| 5,976,017 A | 11/1999 | Omori et al. | |
| 6,130,784 A | 10/2000 | Takahashi | |
| 6,160,666 A | 12/2000 | Rallison et al. | |
| 6,184,969 B1 | 2/2001 | Fergason | |
| 6,593,957 B1 | 7/2003 | Christie | |
| 6,703,988 B1 * | 3/2004 | Fergason | 345/6 |
| 2003/0231460 A1 * | 12/2003 | Moscovitch | 361/681 |
| 2004/0165060 A1 * | 8/2004 | McNelley et al. | 348/14.08 |
| 2005/0156813 A1 * | 7/2005 | Adachi et al. | 345/1.3 |
| 2006/0232719 A1 * | 10/2006 | Abileah | 349/15 |

* cited by examiner

*Primary Examiner*—Lisa Lea-Edmonds
*Assistant Examiner*—Anthony M Haughton
(74) *Attorney, Agent, or Firm*—Renner, Otto, Boisselle & Sklar, LLP

(57) ABSTRACT

A convertible display system includes two displays, beam splitter, and mount, which are adjustable to convert the system for 3D image use and 2D image display use, respectively. In 3D orientation the displays are at an angle to each other and the tops (or bottoms) are proximate each other, the beam splitter is at the bisectrix of the angle for viewing of respective stereo image pairs along a substantially common light path, and the images are provided by reflection from and transmission through the beam splitter. The reflected display provides its image in mirror image orientation relative to the transmitted image. The images are discriminated by polarizers. For 2D use the beam splitter is rotated out of the viewing path and one display is repositioned on the mount generally in side by side relation with the tops of the displays at the top to allow substantially side by side viewing of images provided by the displays. Selectively operable or automatic switching circuitry changes the reflected image between mirror image and non-mirror image orientation.

36 Claims, 14 Drawing Sheets

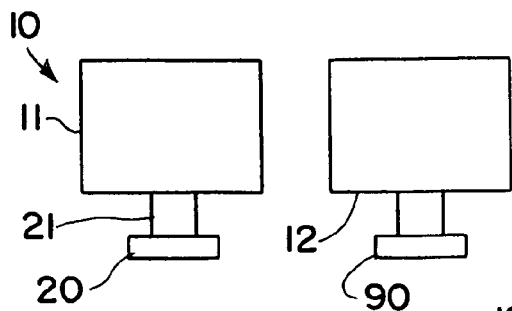
FIG. 10
FIG. 11
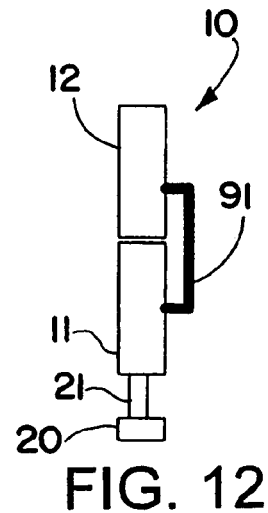
FIG. 12
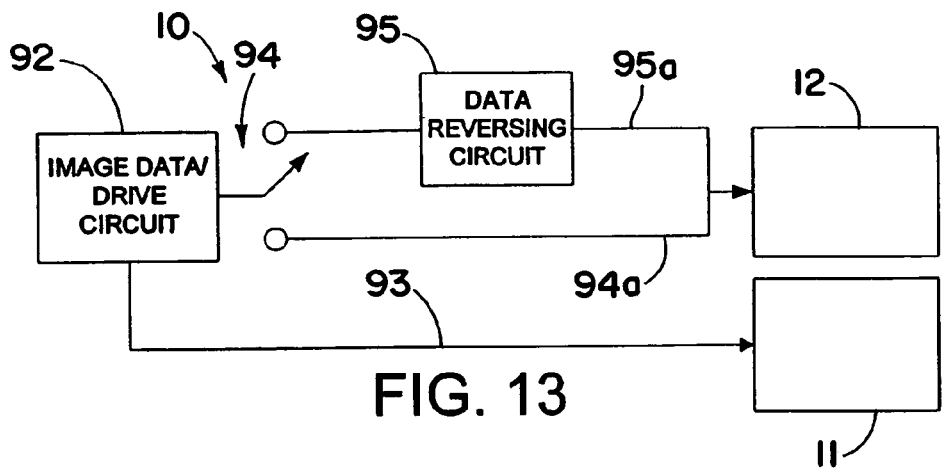
FIG. 13
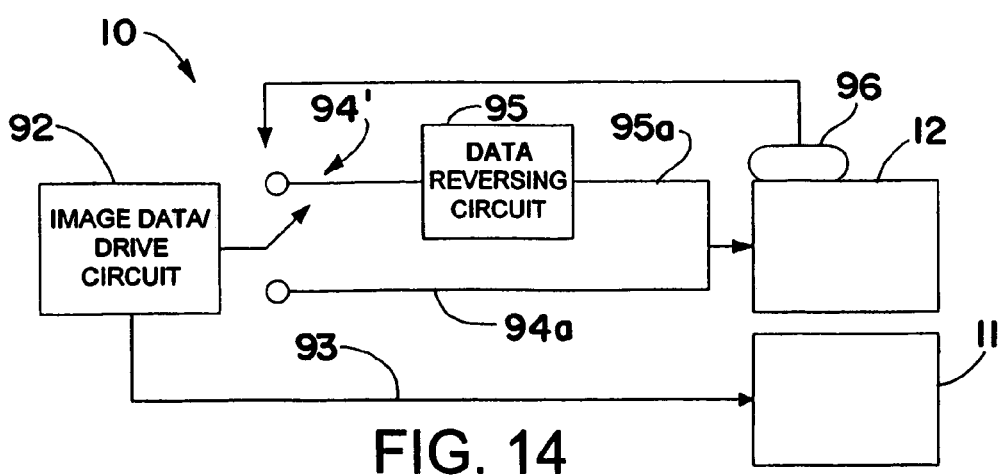
FIG. 14

ADJUSTABLE DISPLAY SYSTEM

This application claims the benefit of U.S. Provisional Application Ser. No. 60/558,868, filed Apr. 1, 2004, which is incorporated herein by reference in its entirety.

TECHNICAL FIELD

The present invention relates generally, as indicated, to adjustable display systems and to methods for converting display systems for uses, respectively, in two-dimensional and three-dimensional (stereoscopic) uses.

CROSS REFERENCES TO PATENTS AND PATENT APPLICATIONS

Reference is made to U.S. Pat. No. 6,703,988, issued Mar. 9, 2004 and to pending U.S. patent application Ser. No. 10/721,968, filed Nov. 24, 2003, and Ser. No. 60/551,700, filed Mar. 9, 2004. The entire disclosures of the foregoing patent(s) and application(s) are incorporated by reference.

BACKGROUND

The use of display systems to display images in three-dimensions or what a viewer, e.g., person, would perceive as a three-dimensional or stereoscopic image is becoming more prevalent. Exemplary uses include those in the field of medicine (e.g., to view part of a body), chemistry and other fields of science (e.g., to view a complex molecule), cartography, architecture, etc. Several approaches for displaying images for 3D viewing are disclosed in the above-mentioned patent(s) and application(s). Those approaches use two displays, sometimes referred to as monitors, televisions, liquid crystal displays, LCDs, or otherwise. Those approaches use two displays on which respective images, such as those of a stereo pair, for example, may be presented substantially simultaneously and do not have to rely on providing the respective images of a stereo pair sequentially on a single display.

It also has become more prevalent for users of computer equipment and/or other systems that require a display for displaying pictures, data, or anything else to use more than one display. For example, one display may provide a picture, drawing, etc., and an adjacent display may present might present descriptive information concerning that which is shown on the first-mentioned display. The images may be presented simultaneously so the user does not have to switch the images shown on a single display. Two displays may be used to present an image that requires a wider area or a taller area to show a given image with acceptable size and/or resolution than would be possible using only a single display; an example would be to display a relatively wide or long spreadsheet. Another use for two displays is to provide a relatively large image of a map. Still another use for multiple displays is to provide a person with the ability to view one display on which the person is displaying a work product or some other particular image, information, etc. while on the other display email messages may be shown. These are just a few examples of uses for several displays able to provide simultaneous direct viewing of them.

Some individuals, who use two displays positioned for simultaneous direct viewing may have a computer monitor positioned on a desk top and also may place a laptop or notebook computer with its display on the same desk top so that both the computer monitor and the laptop or notebook computer monitor may be viewed directly and simultaneously. Some individuals may have two conventional computer monitors positioned on the desk top. Some individuals may use more than two monitors on the desk top. Each monitor usually requires a separate monitor stand and the monitor and/or stand have a footprint such that it/they use(s) an amount of space on the desk top. The more monitors on the desk top, the more space they require and the less space that typically would be available for placing papers or other objects on a desk top and/or for conveniently working on the desk top.

It is desirable to improve the versatility of display systems, for example, conveniently to convert a 3D display system for 3D mode of operation to provide direct view of 2D images, for example, using several monitors, and vice versa.

It is desirable to minimize the desk space required by a monitor; as a corollary, it would be desirable to increase the available space on a desk top when more than one monitor is used. It also is desirable to increase the functionality of display systems.

Use of terms, such as display, monitor, LCD, etc., are intended to be equivalent. Also, use of terms, such as adjustable display system and convertible display system are intended to be generally the same, i.e. adjustable and convertible are used interchangeably. Use of terms such as 3D, stereo, three dimensional, stereoscopic, etc., is intended to mean generally the same thing (or be equivalent), e.g., a view or to provide a view that gives the sense of three dimensions, such as a view with apparent depth into or out of the plane of the image displaying or portraying device (such as the output plane or surface of a display). Examples of 3D display systems and their operation are disclosed in the above-identified patent(s) and patent application(s). Also, use of terms such as 2D, monoscopic, planar, etc. is intended to mean generally the same thing (equivalent), e.g., as would be the typical case of the displaying of an image by a conventional two dimensional display, monitor, television or the like.

SUMMARY

An aspect of the invention relates to a convertible display system including a pair of displays, a beam splitter, and a mount, the mount, displays and beam splitter being cooperative selectively to orient the displays for substantially direct viewing and to orient the displays for viewing, respectively, via reflection by and transmission through the beam splitter.

Another aspect relates to a dual-mode display system including a pair of displays, a beam splitter, and a mount, the mount, displays and beam splitter being cooperative selectively to orient the displays for a substantially direct viewing mode and to orient the displays for viewing, respectively, via reflection by and transmission through the beam splitter in a second mode.

Another aspect relates to a method of converting a display system that has two displays, which are at least substantially the same, from an orientation to provide 2D image display use to an orientation to provide 3D image display use, wherein each display has a directional relation from the top to the bottom thereof and in the 2D orientation such directional relation is substantially the same during use, including rotating one display such that the directional orientation from the top to the bottom thereof is opposite the directional orientation from the top to the bottom of the other display, effecting relative positioning of the displays such that one of both the tops thereof or both the bottoms thereof are relatively adjacent.

Another aspect relates to a method of converting a display system that has two displays, which are at least substantially the same, from an orientation to provide 2D image display mode wherein the two component displays have the same directional orientation, for example the tops of both displays are oriented upwards, to a stereo 3D orientation mode, including rotating one display such that the directional orientation from the top to the bottom thereof is opposite the directional orientation from the top to the bottom of the other display, effecting relative positioning of the displays such that one of both the tops thereof or both the bottoms thereof are relatively adjacent.

Another aspect relates to a method of converting a display system that has two displays, which are at least substantially the same, from an orientation to provide stereo 3D image display use to an orientation to provide 2D image display use, wherein each display has a directional relation from the top to the bottom thereof and in the 3D orientation such directional relation is substantially the opposite during use, including rotating one display such that the directional orientation from the top to the bottom thereof is the same as the directional orientation from the top to the bottom of the other display, effecting relative positioning of the displays for at least substantially direct viewing.

Another aspect relates to a method of converting a display system that has two displays, which are at least substantially the same, from an orientation to provide 2D image display use to an orientation to provide 3D image display use, wherein each display has a directional relation from the top to the bottom thereof and in the 2D orientation such directional relation is substantially the same during use, and from an orientation to provide 3D image display use to an orientation to provide 2D image display use, wherein each display has a directional relation from the top to the bottom thereof and in the 3D orientation such directional relation is substantially the opposite during use, including determining the current orientation of the displays for the associated use, and to convert from 2D to 3D orientation rotating one display such that the directional orientation from the top to the bottom thereof is opposite the directional orientation from the top to the bottom of the other display, and effecting relative positioning of the displays such that one of both the tops thereof or both the bottoms thereof are relatively adjacent, and to convert from 3D to 2D orientation rotating one display such that the directional orientation from the top to the bottom thereof is the same as the directional orientation from the top to the bottom of the other display, and effecting relative positioning of the displays for at least substantially direct viewing.

Another aspect relates to a method of converting wherein the beam splitter can be deployed so as to bisect the angle between the two displays in the 3D mode and be substantially hidden from view behind the two monitors in the 2D mode wherein the deployment of the beam splitter when converting from the 2D mode to the 3D mode is an integrated step in the process of rotating and translating the position of the first display and likewise is an integrated step to stow the beam splitter in converting the display back to the 2D mode.

Another aspect relates to a method of converting the electronic scan of the rotated monitor from a conventional scan in the 2D mode to a reverse scan in the stereo 3D mode.

To the accomplishment of the foregoing and related ends, the invention comprises the features hereinafter fully described and particularly pointed out in the claims. The following description and the annexed drawings set forth in detail certain illustrative embodiments of the invention. These embodiments, however, are merely indicative of a few of the various ways in which the principles of the invention may be employed. Other objects, advantages and novel features of the invention will become apparent from the following detailed description of the invention when considered in conjunction with the drawings.

Although the invention is shown and described with respect to one or more embodiments, it is obvious that equivalents and modifications will occur to others skilled in the art upon the reading and understanding of the specification. One or more of the above and other aspects, objects, features and advantages of the present invention are accomplished using the invention described and claimed below. Also it will be appreciated that a part or feature, etc. shown in one embodiment or drawing may be used in the same or a similar way in another embodiment. The present invention includes all such equivalents, modifications, and the like and is limited only by the scope of the claims.

BRIEF DESCRIPTION OF THE DRAWINGS

In the annexed drawings:

FIG. 10 is a schematic illustration showing the displays separate and apart from each other in an orientation for 2D mode of operation of the display system;

FIGS. 11 and 12 are, respectively, front and side elevation schematic illustrations showing the displays in 2D mode in vertical orientation;

FIG. 13 is a schematic illustration of a display system with an image drive circuit to provide image data for display by the respective displays in 2D or 3D mode;

FIG. 14 illustrates an automated switch arrangement associated with the image drive circuit of FIG. 13 for detecting the orientational mode of the display system to set the manner of delivering image data to one of the displays either in normal or direct manner or in reverse or inverted manner;

DESCRIPTION

Figure 3:
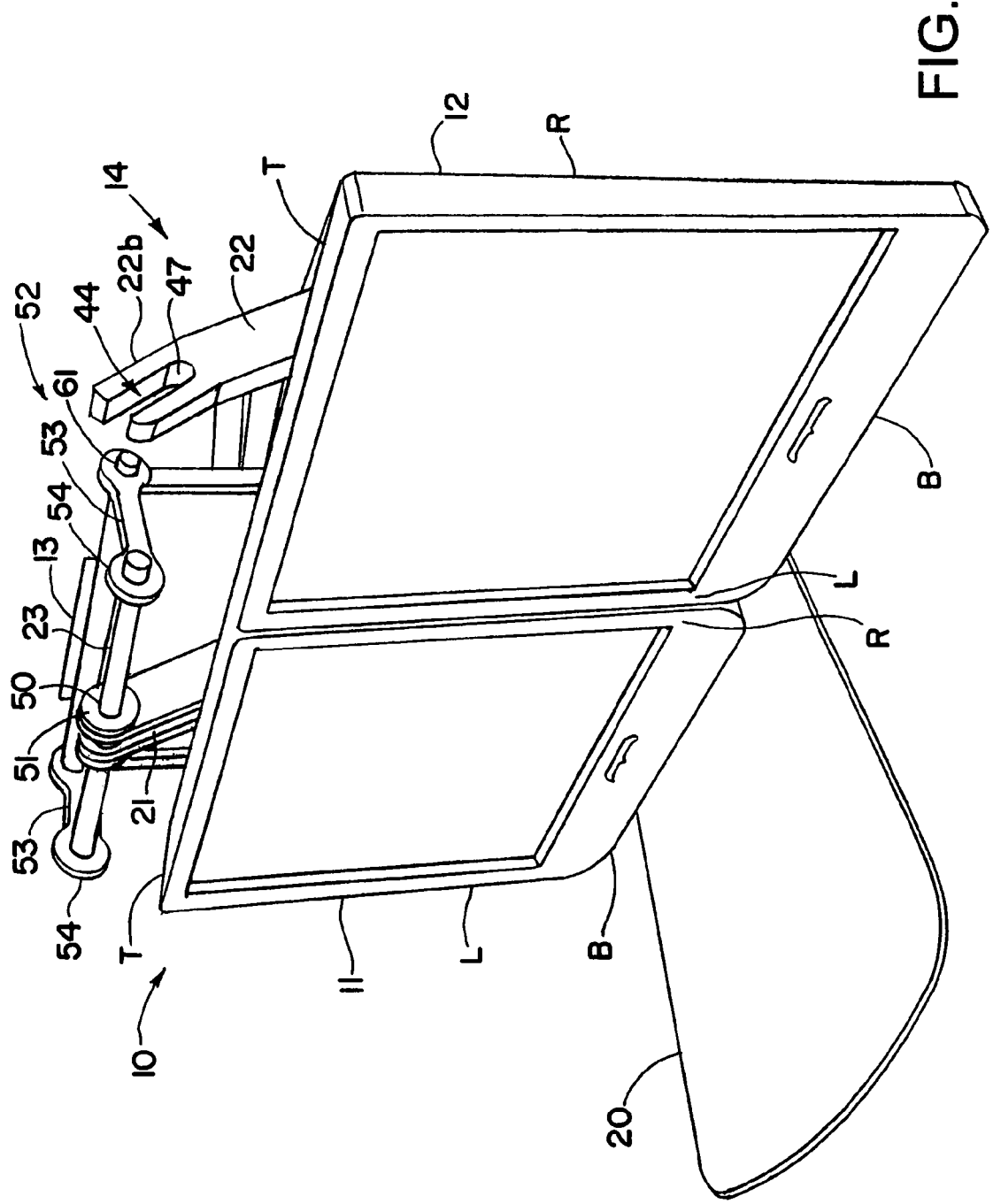
FIGS. 3 and 4 are, respectively, front and back perspective views of two displays in side by side relation and the beam splitter in a stored position thereby allowing the two displays to be viewed substantially directly and simultaneously.
Figure 4:
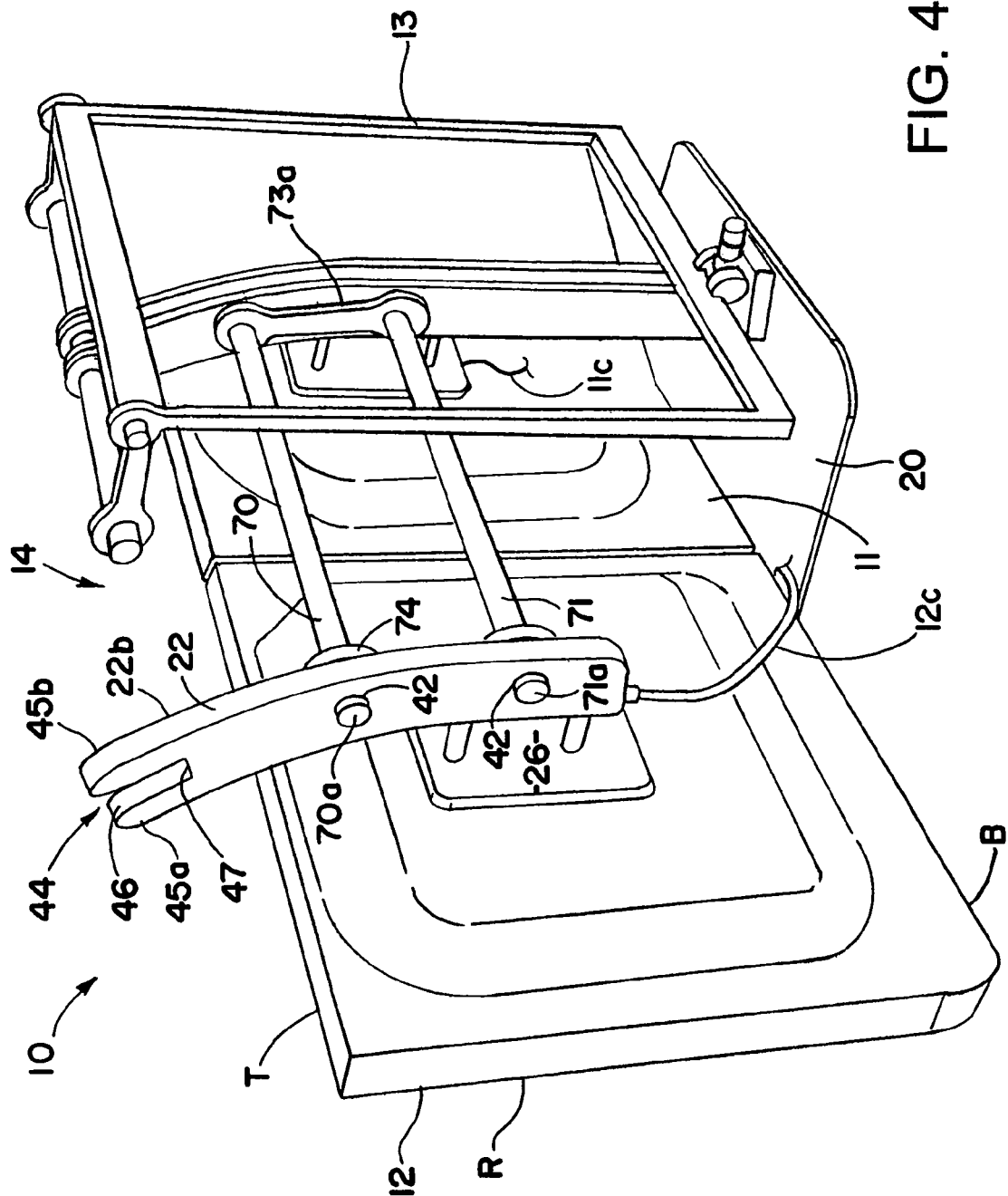

In the description below and with reference to FIGS. 1-4 an adjustable display system (also referred to as a convertible display system) is illustrated at 10. The display system 10 includes a pair of displays 11, 12, a beam splitter 13 and a mount 14. The display system may be configured for operation in 3D mode (FIGS. 1 and 2) and for operation in 2D mode (FIGS. 3 and 4). The display system can efficiently be converted from one mode to the other as is described in detail below. In the 2D mode the displays 11, 12 can be viewed as conventional 2D displays. In the 3D mode the displays 11, 12, respectively, are provided with image data representing respective left eye and right eye images. Also, in the 3D mode the display 12 provides an inverted, mirror image for reflection by the beam splitter 13 in appropriate alignment with the image provided by the display 11 that is transmitted by the beam splitter to obtain a 3D image effect when one or more stereo pairs of images are provided by the display system 10 for viewing.

The display system 10 may be used as a desk top monitor having two displays 11, 12 that may be coordinated or independently operable to display information in 2D mode or may be converted to a configuration for 3D mode. In the illustrated 3D mode the displays 11, 12 are positioned in a somewhat vertical relation whereby the display 12 is over or above the display 11; the display 11 is under or below the display 12; thus, such arrangement or orientation sometimes is referred to as an over and under orientation. In 2D mode the displays may be in a side by side landscape configuration or in some other configuration. The display system 10 may be converted between modes relatively quickly and efficiently while providing relatively secure mounting and positioning of the parts both during the conversion and while in use to display images. The conversions can be done repeatedly and the mount provides for relatively precise positioning of the respective parts for operation in the respective 3D and 2D modes. As is described elsewhere herein, the scan electronics for the display that is moved, e.g., display 12, may be switched from a standard left to right scan in conventional 2D mode to a right to left scan in the 3D stereo mode of operation.

The mount 14 of the display system provides support for the displays 11, 12 and beam splitter 13 in respective orientations to obtain the respective 2D and 3D modes of operation of the display system 10. Converting the display system 10 between modes may be carried out in the manner described in further detail below, for example, with reference to FIGS. 5-8.

In the 2D mode the displays 11, 12 can be viewed directly as conventional 2D displays, for example, being positioned generally in a vertical plane or in some other orientation. To obtain the inverted, mirror image effect for the display 12 in the 3D mode, the display 12 may be physically rotated relative to its orientation in 2D mode reversing the top and bottom of that display, and the image data supplied to the display 12 may be reversed, e.g., electronically, or may be otherwise provided to the display 12 to invert or to reverse the image provided by that display. Therefore, after reflection by the beam splitter 13, the image shown by the display 12 is generally aligned with the image shown by the display 11, and the stereo pair(s) may be provided via the beam splitter for viewing to present a 3D image effect. The mount 14 cooperates with the display 11, display 12 and beam splitter 13 to hold those parts for 2D and 3D modes and facilitates converting the display system 10 from one mode to the other, as is described further below.

Figure 1:
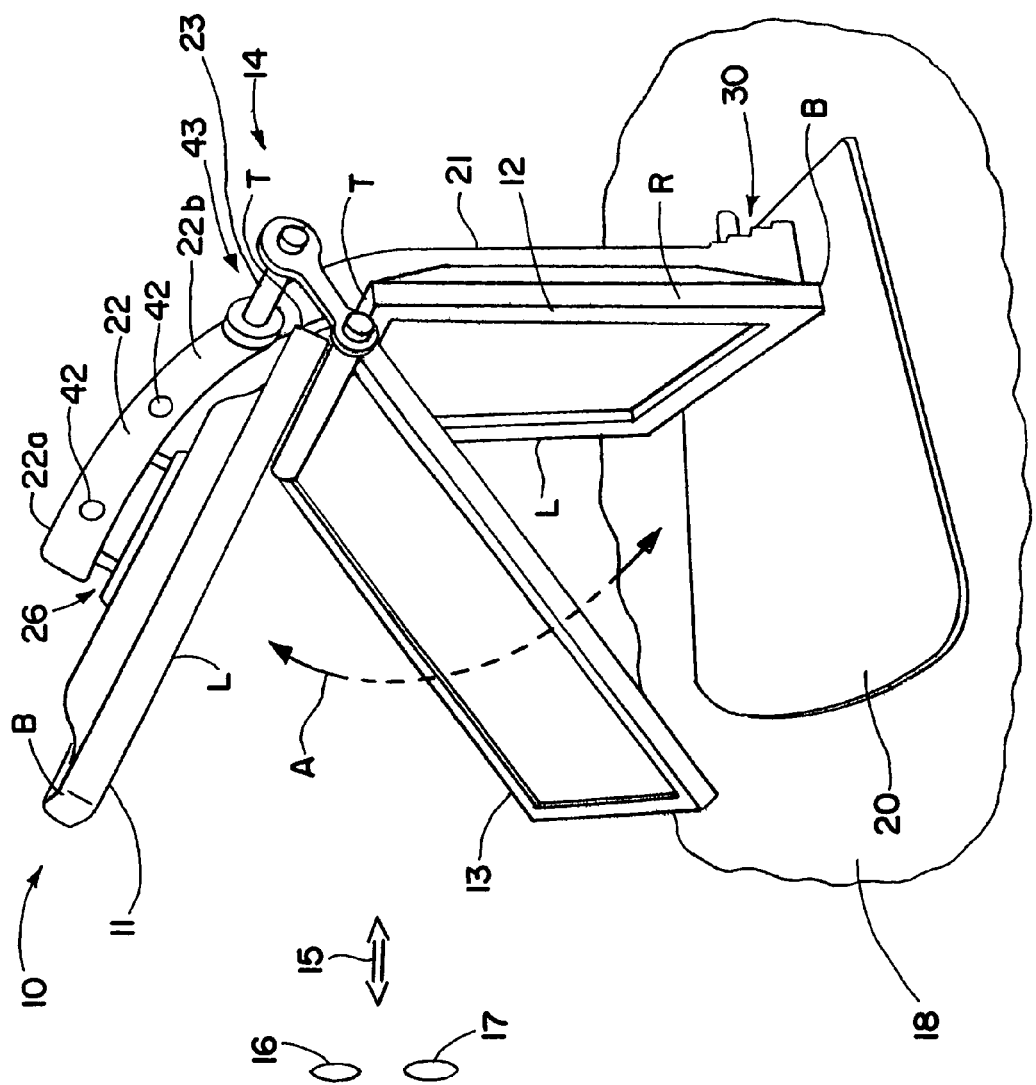
FIGS. 1 and 2 are perspective front and back views of an adjustable display system having a pair of displays and a beam splitter oriented in 3D mode for use in displaying images for viewing as 3D images.
Figure 2:
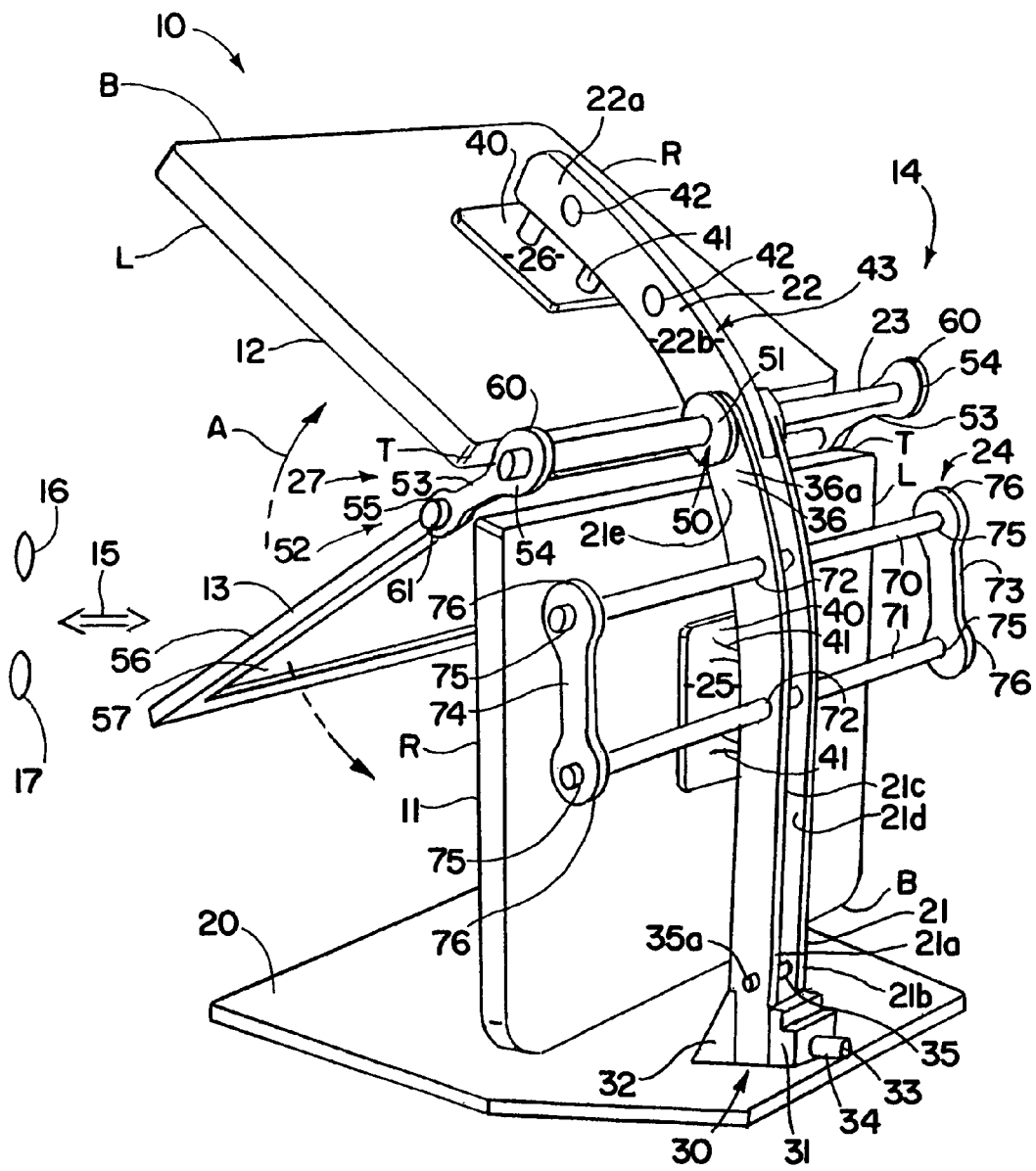

In FIGS. 1 and 2 the display system 10 parts are oriented for operation in a 3D, stereo, stereoscopic, or three dimensional mode to provide for viewing of 3D images. As was mentioned above, the terms 3D, stereo, stereoscopic, three dimensions, and the like are intended to mean generally the same thing, e.g., to provide a view in three dimensions, a view with apparent depth into or out of the plane of the display or displays that provide the images, etc. Examples of 3D display systems and their operation are disclosed in the above-identified patent(s) and patent application(s). In the 3D mode of operation the display system 10 may operate in the same way or in a similar way as those of such patent(s) and patent application(s) or may operate in some other way to provide 3D images, images for 3D viewing, etc.

In FIGS. 3 and 4 the parts of the display system 10 are oriented to provide substantially direct simultaneous viewing of the two displays 11, 12. The beam splitter 13 is out of the viewing path of the viewed display(s). In the direct view mode of the display system 10 shown in FIGS. 3 and 4, the displays 11, 12 can be viewed as conventional displays or otherwise used, as may be desired. For example, each display 11, 12 may be used to provide a respective image, parts of an overall image, the same image, etc. Those images may be provided for viewing as two dimensional images—sometimes referred to as monoscopic images, planar images, etc. This operational mode of the display system 10 is referred to for convenience as 2D mode. If desired, in 2D mode the images may be provided sequentially on one display as respective stereo pairs that can be discriminated to provide for 3D viewing in the manner of conventional 3D displays that typically use a single display.

In FIGS. 5-8 the functions and cooperative interaction or use of the several parts of the display system 10 are shown to illustrate respective orientations of the parts and steps to convert the display system for use, respectively, in 3D and 2D modes. The sequence of steps in the conversion depicted in FIGS. 5-8 show converting the display system 10 from 3D mode to 2D mode. The display system 10 may be converted from 2D mode to 3D mode by following the sequence of those drawing figures in reverse order, i.e., from FIGS. 8-5. It will be appreciated that the parts and steps illustrated in FIGS. 5-8 and in other drawings hereof for orienting and converting the orientation of the display system 10 and described herein are exemplary. Other arrangements of parts and steps and the order of performing the various steps to provide for operation of a display system in 2D and 3D modes also may be used and are in the scope of the invention. Directions are mentioned herein to facilitate the description, but it will be appreciated that other directional arrangements of the display system 10 and the parts thereof may be employed.

As is illustrated in FIGS. 1 and 2 for use or operation of the display system 10 in a 3D mode, the displays 11, 12 and beam splitter 13 are held in relative position by the mount 14 to provide for 3D viewing of images that are provided by the displays. For example, those images would be provided on the respective displays as stereo pairs such that the image from the display 11 can be viewed by transmission through the beam splitter 13 and images provided by the display 12 can be viewed by reflection from the beam splitter 13.

Light output representing images provided by the displays 11, 12 is optically polarized. Polarization may be by the displays 11, 12 themselves or the light may be optically polarized by additional optical members (not shown). The images from the displays are provided via the beam splitter along a common or substantially common optical path 15 so that the images can be viewed by a person looking at the display system 10. The respective images can be separated or discriminated based on optical polarization (sometimes referred to herein simply as polarization) to provide respective left eye and right eye images to create a 3D image effect when appropriately viewed by a person, e.g., viewing the images through respective polarizers 16, 17 (sometimes referred to as analyzers).

The stereo pair images are provided such that one is the mirror image and/or is inverted relative to the image provided by the other display. This allows for the two images of the stereo pair to be relatively superpositioned as they are viewed via the beam splitter 13 although portions of one image may be shifted relative to or somewhat different from corresponding portions of the other image. Such variation between the images of a stereo pair, when viewed, respectively, by the left and right eyes of a person, provide for the appearance of depth to obtain the 3D or stereoscopic image effect.

The display system 10 may be placed on a desk top 18, table, computer desk, floor, etc., and, if desired the display system may be suspended from a suspension mount on a ceiling or wall, may be mounted on a pole or the like or may be otherwise positioned for use.

In the embodiment of display system 10 illustrated in FIGS. 1 and 2, for example, the displays 11, 12 are the same; each is an active matrix liquid crystal display that provides polarized light output representing respective images. Other types of displays also may be used. By using the same displays with the same resolution, optical characteristics, size and image size, the 3D views and viewing experience tend to be optimized, for example, for quality of image, ease of viewing without fatigue, etc. However, if desired, one or more of those or other parameters or characteristics of the displays 11, 12 may be different for the respective displays. Operation of the display system 10 in 3D mode may be according to the operation described in the above-identified patent(s) and patent application(s), which are incorporated by reference.

Each display 11, 12 has a top (T), bottom (B), left side (L), and right side (R). The displays 11, 12 and beam splitter 13 are oriented such that the displays are at an angle A with respect to each other and the beam splitter is at the bisectrix of such angle. In 3D mode of operation of the display system 10 images from the display 11 can be viewed via transmission through the beam splitter 13 and images from the display 12 can be viewed by reflection from the beam splitter.

The mount 14 holds the displays 11, 12 and the beam splitter 13 in an orientation illustrated in FIGS. 1 and 2 such that an image from the display 11 can be transmitted through the beam splitter 13 for viewing thereof and an image from the display 12 can be reflected by the beam splitter 13 for viewing thereof. In the illustrated embodiment the displays 11, 12 are arranged at an angle such that the beam splitter 13 is at the bisectrix of the angle. For example, in the illustrated embodiment the output surface for each of the displays 11, 12 is in a respective plane; and those planes intersect along a line or axis. The beam splitter is in a plane that is parallel to and may be congruent with such axis. The angle illustrated in FIG. 1 is an obtuse angle. However, the angle between the displays can be larger or smaller than the illustrated obtuse angle. The angle may be a 90 degree angle or an acute angle.

In operation of the displays system 10 in 3D mode, the top T of the displays 11, 12 are positioned relatively adjacent each other. Therefore, the top of one image of a stereo pair that is provided by the display 11 will be seen as viewed directly through the beam splitter 13; and the top of the other image of the stereo pair, which is provided by the display 12, will be seen as reflected by the beam splitter 13 generally in superposed relation to the top of the image from the display 11. Therefore, by inverting the display 12 relative to the display 11 (e.g., turning the display 12 generally "upside down") so that the tops are proximate each other, such relatively vertical alignment of the tops of the respective images provided by the displays for generally superpositioning the images in the vertical direction as viewed via the beam splitter 13 may be accomplished.

Further regarding operation of the display system 10 in 3D mode, to obtain a mirror image effect of the image that is provided by the display 12 relative to the image provided by the display 11, the direction of providing data for display by the display 12 can be reversed. For example, in an exemplary display image data is scanned or is provided to the display in a direction from left to right; for the display 12 that image data may be provided in reverse direction, e.g., from right to left. Therefore, the respective images of respective stereo pairs of images will align appropriately to provide for 3D viewing thereof to provide the sense of a 3D or stereoscopic image when viewed through the polarizers 16, 17. The reversal of the direction of the image or of the providing of image data to the display that provides a reflected image may be carried out electronically. For example, the image data may be provided to a buffer and the data from the buffer may be provided to the respective pixels of the display 12 in reverse sequence compared to the sequence that image data is provided to the pixels of the display 11. It will be appreciated that other approaches may be taken to reverse the direction of image data provided to the display 12. Moreover, it will be appreciated that depending on the arrangement or organization of the image data, that data which is provided to the display 11 may be reversed from the normal direction or sequence whereas the data that is provided the display 12 may be in the normal direction or sequence. Various other approaches also may be used to provide for the two images of a stereo pair to be appropriately aligned to provide for viewing of the images to obtain a 3D image effect.

The reversal of the data provided to the display that shows the mirror image for reflection by the beam splitter can be achieved using circuitry that is built in as a part of the display, by a separate circuit or circuit card, and/or by graphics software that provides data to the display. One example of such built in or separate circuit is illustrated in FIGS. 13 and 14, which are discussed below. Thus, the image conversion to mirror image orientation (or back to normal image data presentation for 2D use) may be internal to the display, e.g., using the display controller. Alternatively, a stand alone circuit or circuit card may be installed in a computer, e.g., a personal computer (PC), that has an input connection and an output connection whereby the original data can be input to the circuit or circuit card and mirror image data can be provided by the output connection from the circuit or circuit card to the display; for 2D operation in which normal non-mirror image data is provided the display the circuit or circuit card may be bypassed, for example, by a switch or by simply revising the connection of the original data directly to the display. Another alternative using graphics software, as is mentioned above, may use a software option that is built in to a graphics driver circuit or circuit board; such a software option that allows switching between providing original data or mirror image data to a display is sold under the trademark Nvidia by Nvidia Corporation of Santa Clara, Calif. Further discussion regarding mirror image circuitry, switching and operation is provided below with respect to FIGS. 13 and 14.

In the 3D mode, the images provided by the displays 11, 12 are provided via the beam splitter 13 along a common optical path, such as that represented by the arrow 15. The images may be viewed using polarizers 16, 17 such that the images are separated or discriminated, whereby the left eye image provided as one image of a stereo pair is seen by the left eye of a person and the right eye image provided as the other image of the stereo pair is seen be the right eye of the person. Other possibilities to obtain discrimination between images also may be possible and in accordance with the present invention. Also, the direction or sense of polarization of the display 12 (or the light provided from the display 12) would remain the same without regard to orientation of that display in the 2D mode or 3D mode since in those respective modes the display 12 is in one orientation or is rotated 180 degrees.

As will be appreciated, by using in the display system 10 displays 11, 12 that are the same, the optical polarization characteristics of the light provided by the displays 11, 12 are the same or at least are quite similar. Therefore, angle of view variations between the respective displays 11, 12 may be the same or nearly the same, thus further enhancing the quality of images provided by and viewed from the display system.

The beam splitter 13 may be of the non-polarizing type in that it does not affect polarization of light; such beam splitters sometimes are referred to as polarization neutral beam splitters. The beam splitter 13 may change the direction of light propagation by reflecting the light, but it does not affect polarization. The beam splitter may function to rotate the plane of polarization or to change the sense of circular polarized light in the manner described in the above-identified patent(s) and/or patent application(s). Additional optical elements may be used as are described in the above-identified patent(s) and/or patent application(s) to obtain a desired optical operation of the display system.

For the display system to operate in a 2D mode, the displays 11, 12 may be directly viewed without the need for reflection via the beam splitter 13. The displays 11, 12 may be placed in side by side relation or in some other relation, e.g., laterally spaced apart, vertically spaced apart, or in some other arrangement; or, if desired, only one of the displays may be used to provide images. However, since image reversal due to reflection by the beam splitter 13 would not be needed in the 2D mode of using the displays, the reversing of the direction or sequence of data presentation by the one display, e.g., display 12, as was mentioned above, would be stopped or would not occur; rather the image data would be provided the display in the normal manner to provide a correct image. Also, the display 12 would be turned or rotated top to bottom, whereby the top is at the top in the 2D mode and the bottom is at the bottom so that the tops T of both displays 11, 12 are arranged such that the top of an image displayed thereby appears at the top of the display and the bottom of an image displayed thereby appears at the bottom of the display.

It is noted here that reference to top and bottom and to other directions herein are relative, are presented to facilitate the description of the invention and are not intended to be limiting. Also, although the display system 10 was described above in the 3D mode having the tops of the displays 11, 12 relatively adjacent each other, it will be appreciated that instead the bottoms may be relatively proximate each other and, if necessary, appropriate adjustment of the image data may be provided. Also, although the displays 11, 12 are described as having the physical tops or bottoms relatively proximate each other in the 3D mode, e.g., as is illustrated in FIGS. 1 and 2, it will be appreciated that such effect may be achieved using electronics to reverse the image data for one of the displays so that the tops of the displays are not relatively adjacent, but the tops of the images provided by the respective displays are relatively proximate each other and the bottoms of the images are relatively remote from each other.

The mount 14 is shown in the several drawing FIGS. 1-8. Initially referring to FIGS. 1 and 2, the mount 14 includes a base 20 (e.g., for positioning on a desk top 18 or otherwise positioned, suspended, etc.), four support portions 21-24, and a number of connections 25-27 to connect respective support portions to the displays 11, 12 and beam splitter 13. A mechanical connection 30 connects the bottom end of the support portion 21 to the base 20. The support portions 21-24, connections 25-27, displays 11, 12, and beam splitter 13 are supported by the base 20 either directly or indirectly, as is described below. In the illustrated embodiment in FIG. 2, for example, the mechanical connection 30 includes a pair of upstanding clamping members 31, 32, which are secured to the base 20, for example, by welding, adhesive, screw or rivet fasteners, or by some other means. A screw 33 of the mechanical connection 30 may be tightened to squeeze the clamping members 31, 32 toward each other to clamp the support 21 there between securely to hold the support in position relative to the mechanical connection 30 and to the base 20. The screw 33 may pass through an opening in the clamping member 32 and through a corresponding opening or space in the support member 21 and be secured in a threaded opening in the clamping member 31. If desired, the screw 33 may be replaced by a bolt and nut, some other fastener, etc. Conveniently in the illustrated embodiment the screw 33 has a head 34 that allows the screw to be tightened and loosened using manual force without the need for additional tools, if desired, thereby to tighten the screw or to loosen and/or to remove the screw, whereby the support 21 may be secured in the mechanical connection 30 or may be removed therefrom, respectively.

The support 21 is a generally elongate, generally upstanding vertical member that extends upward above the base 20 to hold the display 11 via the connection 25 in position for viewing through the beam splitter 13 in 3D mode and for direct viewing in the 2D mode of operation of the display system 10. The support 21 may be formed of a pair of parallel struts 21a, 21b. One or more spacers 35, 36, respectively near the opposite ends of the support 21 may secure the respective struts 21a, 21b together in parallel relation as is illustrated in FIG. 2, for example. The spacers 35, 36, and other spacers, if used, may be bolts, rods, etc., that are secured to the two struts as by welding, threading, etc. In the illustration of FIG. 2, for example, the spacers 35, 36 are metal rods that are positioned in respective openings, such as opening 35a, 36a in the struts, and those rods are welded in place. Adhesive may be used to retain the rods in place. Other means may be used to maintain the rods in place, too. The rods 35, 36 may include wider and narrower diameter portions such that the ends of the wider diameter portions bear against opposed walls 21c, 21d of the respective struts 21a, 21b and the narrower diameter portions fit in respective openings, e.g., opening 35a, 36a. Other forms of spacers and/or spacer materials also may be used. Alternatively, the support 21 may be in the form of a U-shape cross section channel having a pair of walls that form the struts 21a, 21b and a third wall or web (not shown) that joins the struts.

The connection 25 provides mechanical connection between the display 11 and the support 21. The connection 25 may include a metal or plastic plate 40 and a number of mounting rods 41. The plate 40 is attached to the display 11, e.g., by screw fasteners 40a, adhesive, or other means. The mounting rods 41 attach the plate 40 to the support 21. The mounting rods 41 may be welded to the support 21, secured by adhesive material, clamped in place, or be threaded in respective threaded openings thereof, etc. The mounting rods 41 may be attached to the plate 40 by adhesive, welding, threaded connection, or other means. The connection 25 is but one example of a device for mounting or supporting the display 11 from the support 21. It will be appreciated that other approaches may be used to mount or support the display from a support 21.

The supports 22-24 are supported by the support 21. The support 22 is illustrated as a bar having a generally elongated shape. The connection 26 is similar to the connection 25 in that it includes a plate 40 and a number of mounting rods 41. The plate 40 and mounting rods 41 may be secured to each other and may be respectively secured to the display 12 and to the support 22. The bar of the support 22 includes a number of holes 42 through the bar for cooperating with the support 24, as will be described below. The connection 26 is coupled to the support 22 at one end 22a thereof. At the other end 22b of the support 22 is part of a coupling 43 attaching the supports 21, 22 to each other. As is seen in FIGS. 1 and 2, the supports 21, 22 and 23 hold the displays 11, 12 directly, respectively, and the beam splitter 13 in the relation described above for operation in 3D mode. Thus, the planes in which the images are provided by the respective displays 11, 12 and the plane in which the beam splitter 13 is located may intersect along a common line, the displays are at an angle relative to each other, e.g., an obtuse angle or some other angle, as was described above, and the beam splitter is located at an angle that in effect is the bisectrix of the angle between the displays.

The coupling 43 is seen in FIGS. 1-4, for example. In FIGS. 3 and 4 the end 22b of the bar forming the support 22 is illustrated separate and apart from the support 21. The end 22b of the support 22 has a slot 44 between a pair of legs 45a, 45b. The slot 44 extends generally longitudinally along part of the length of the support 22, is open at one end 46 and is closed at the opposite end of 47 of the slot.

At the upper end 21e of the support 21 the spacer 36, such as, for example, a metal rod, is held in respective openings 36a in the respective parallel struts 21a, 21b of the support 21. Also at the upper end 21e of the support 21 are openings 50 (FIG. 3) in the struts 21a, 21b through which the support 23 may pass and by which it may be held. The support 23 may be a rod, for example, as is illustrated in FIGS. 1-4, for example. To assemble the supports 21, 22 at the coupling 43 in the manner illustrated in FIGS. 1 and 2, the support 22 is aligned with the support 21 to slide between the surfaces 21c, 21d of the struts 21a, d1b. The slot 44 is aligned with the rod 23. The space between the opposed surfaces 21c, 21d of the struts 21a, 21b accommodates the thickness of the support 22 so that the slot can fit over that portion of the support 23 between those opposed surfaces and into position with the spacer 36 also in the slot 44. The surface 47 at the end of the slot 44 engages the support 23 in the coupling 43 to serve as a stop that limits the extent that the support 22 can be inserted along the support 21 between the struts 21a, 21b. With the supports 21, 22 positioned in the manner just described to form the coupling 43, the stop surface 47 (or part of it) rests against the support 23, the support 23 and the spacer 36 hold the support 22 relative to the support 21 so that the two tend not to pivot or rotate relative to each other about an axis parallel to the axis of the generally linear extent of support 23 or spacer 36. Also, the spacing between the opposed walls of the struts 21a, 21b may be of a size to be relatively close fitting to the respective confronting surfaces 22c, 22d of the bar forming the support 22. Therefore, the supports 21 and 22 form a generally continuous support piece elongate with some degree of curvature in the manner illustrated in FIG. 2.

The curvature of the supports 21, 22 and the locations of the displays 11, 12 on the supports tend to cause the support 22 to apply a torque (rotational force) to the support 23 and spacer 36, which are relatively securely held in the support 21. Thus, the support 21 provides a reaction torque to that applied by the support 22, and the support 21 is retained relatively securely in position with respect to the base. Such interaction and the interaction between the confronting surfaces of the support 22 and the surfaces 21c, 21d of the struts 21a, 21b tend to make the coupling 43 relatively secure so the displays 11, 12 are maintained in relatively fixed position with respect to each other.

The support 23 supports the beam splitter 13. The support 23 is held by the support 21 by engagement with walls surrounding openings 50 (FIG. 4) through the struts 21a, 21b. Retainers 51 are attached to the support 23, e.g., by set screws or other fastening means, and face the exterior (non-opposing) walls of the struts 21a, 21b to hold the support 23 in relatively fixed position with respect to the support 21. The retainers 51 also may provide for a distributing of force from the support 23 to the outer surfaces of the struts 21a, 21b in the event that a twisting torque were applied to the support 23.

The support 23 may be an elongate metal rod (and may be referred to as a "rod," "rod support" or "support rod" below) that has circular cross section allowing it to rotate in the openings 50 while the retainers 51 permit such rotating, on the one hand, yet provide distributing of force, as was mentioned above. The rod 23 may be of a non-circular cross section and the holes 50 may be of a non-circular cross section and of about the same size as the cross section of the rod 23; and, in that case the rod 23 would not be rotatable about its axis. If desired, the retainers 51 may be secured to the outer surfaces of the struts 21a, 21b, e.g., as by an adhesive, welding, or some other means. In such case the openings through the retainers 51 could be coordinated with the openings 50 and the struts 21a, 21b, and the retainers would provide the forced distribution function mentioned above, but they may not necessarily provide the axial alignment of the support rod 23 without some other mechanisms to provide that alignment function. Such axial alignment allows for the support rod 23 and the beam splitter 13 to be positioned appropriately relative to the displays 11, 12 in alignment with the respective displays to transmit and to reflect respective images therefrom as is elsewhere described herein.

An articulated coupling 52 connects the beam splitter 13 to the support rod 23. The articulated coupling 52 includes a pair of support links 53, which are coupled at respective ends 54 to the support rod 23 and 55 to the frame 56 surrounding the glass or other material 57 of the beam splitter 13. Set screws 60 secure the links 53 to the support rod 23 to hold the links at given axial locations along the support rod 23 and to prevent rotation of the links relative to the support rod 23. A screw fastener 61 at each side of the beam splitter 13 secures the end 55 of respective links 53 to the beam splitter. The angle of the beam splitter in its orientation illustrated in FIG. 2 relative to the displays 11, 12 may be selectively adjusted by loosening the set screws 60, the fasteners 61, and/or the retainers 51 at the coupling 43.

If desired, the support rod 23 may be rotatable in the openings 50 to allow for rotation of the beam splitter 13 with the support rod 23. In such case an appropriate stop may be provided to limit such rotation so that the beam splitter would be held in position at the bisectrix of the angle between the two displays 11, 12. The stop may be, for example, a mechanical stop provided by grooves in the support rod 23 and pins in the retainers 51. If desired, such stop function may be provided by the links 53 resting against a top edge of the display 11. For storing the beam splitter 13 a rotation of the beam splitter about the axis of the support rod 23 is effected, as will be described below. Such rotation may be provided either by allowing rotation of the support rod 23 and/or by loosening the set screws 60 to allow the links 53 to rotate about the support rod 23.

Referring to FIGS. 2 and 4, the support 24 includes a pair of support rods 70, 71 that pass through respective openings 72 in the struts 21a, 21b of the support 21. The support 24 also includes a pair of links 73, 74, which cooperate with the rods 70, 71 for strength and to hold a parallel relation of the rods to each other and a perpendicular relation of the rods to the support 21 or such other directional relation as desired. The links 73, 74 may limit the extent to which the rods 70, 71 may slide relative to the support 21, e.g., so they do not fall out unintentionally. The links 73, 74 have openings 75 through which the respective support rods 70, 71 may pass and set screws 76 that may be tightened to retain the links in fixed relative position with respect to the support rods 70, 71. The set screws 76 may be loosened to allow a link to slide along the support rods 70, 71, if desired, and to allow the support rods to be inserted through the openings 72 in the struts 21*a*, 21*b* for positioning on the support 21.

To set up the display system 10 in the manner illustrated in FIGS. 1 and 2 such that the parts thereof, including the displays 11, 12 and beam splitter 13 are oriented for operation in 3D mode, the support 21 and display 11 are mounted in the base 20. The beam splitter 13 is positioned in the manner illustrated in FIGS. 1 and 2 by appropriately locating the support rod 23 in the support 21, securing the links 53, e.g., by the set screws 60 to the support rod 23, and tightening the fasteners 61 so that the beam splitter is held at the desired angle, e.g., what will be the bisectrix of the angle between the displays 11 and 12 as was described above. The display 12 is mounted relative to the display 11, which is mounted on the support 21, by sliding the end 22*b* of the support 22 between the struts 21*a*, 21*b* so part of the support rod 23 becomes positioned in the slot 44, so part of the spacer rod 36 becomes positioned in the slot 44, and the stop surface 47 engages the support rod 23, thus providing the coupling 43. In such orientation of the parts the display system 10 may be operated in 3D mode. The support 24 is shown in FIG. 2 in stored position held by the support 21; in 3D mode the support 24 may be removed from the support 21, if desired.

Reference is made to FIGS. 3 and 4 in which the display system is shown in 2D mode. The mount arrangement 14 provides holding and positioning of the displays 11, 12 by the supports 21, 22 and 24. The support 21 is attached to the display 11 by the connection 25, as was described above. The display 12 is held by the support 24. An end 70*a*, 71*a* of each of the mounting rods 70, 71 is positioned in a respective opening 42 of the support bar 22, which is attached by connection 26 to the display 12. As is illustrated in FIG. 4, the link 73 may be positioned adjacent the support bar 22 to provide stiffening and/or strengthening effect. An additional link 73*a* may be added to the support 24 between the two mounting rods 70, 71, as is illustrated in FIG. 4, or the position of the link 74 may be moved to the position illustrated in FIG. 4.

It will be appreciated that the support 21 provides support for both of the displays 11, 12 both in the 3D mode, as is illustrated in FIGS. 1 and 2, and in the 2D mode, as is illustrated in FIGS. 3 and 4. In the 2D mode the slot 44 of the support 22 cooperates with the support 21 at the coupling 43. In the 3D mode, the openings 42 in the support 22 cooperate with the support 24, which in turn is held by the support 21. In the 2D mode the display 12 may be fully held in space above the surface, e.g., a desk top, on which the base 20 is positioned so that the display 12 does not take up space on that desk top. However, if desired, a separate foot or base may be provided for the display 11 to support it or to help support it from such desk top surface or the like, as is described further below.

As is seen in FIGS. 3 and 4, in the 2D mode the beam splitter 13 is out of the way of the direct view of the displays 11, 12 to allow for direct viewing of the displays without loss of light that may be absorbed by the beam splitter or any other affect that the beam splitter may have on viewing images on the displays 11, 12. In the stored orientation, the beam splitter 13 is behind the display 11, being held there by the support rod 23 and the articulated joint formed of the links 53, 54 fastened between the beam splitter and the support rod 23. The end 13*b* (e.g., the distal end) of the beam splitter frame that is relatively remote from the links 53, 54 may rest on a surface 30*a* of the mechanical connection 30. If desired, a securement feature may be added to the mechanical connection 30 to retain the beam splitter in that stored orientation, as is illustrated in FIG. 4.

Although the display 12 is illustrated in FIGS. 3 and 4 supported by the mount 14 in proximity to the display 11, it will be appreciated that the display 12 may be totally removed from the mount 14 and placed on its own stand, e.g., a separate foot, support or the like.

Figure 5:
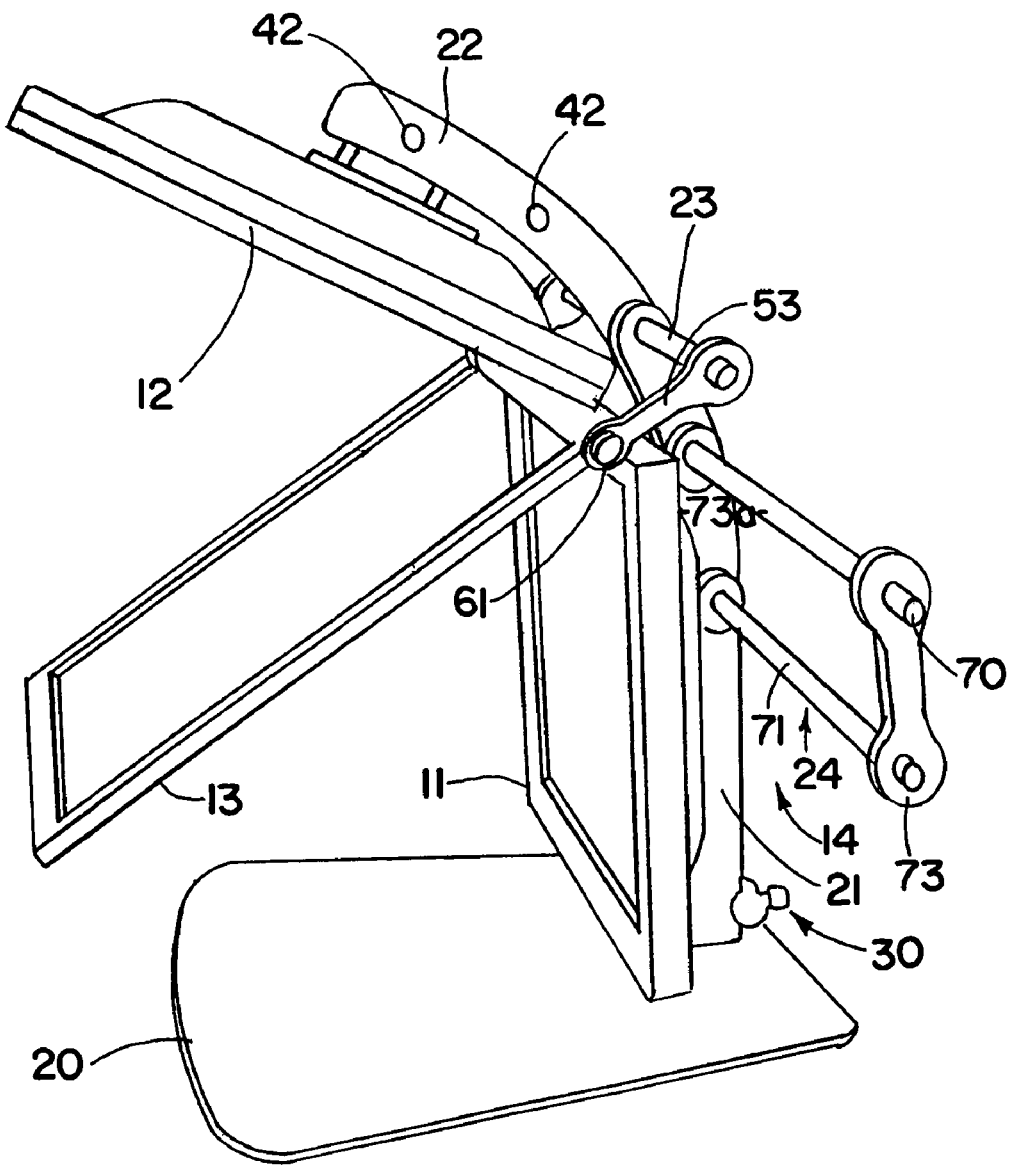
FIGS. 5-8 are respective perspective views of the adjustable display system of FIGS. 1-4 in respective stages of conversion between 3D and 2D modes.

Referring now also to FIGS. 5-8, the steps to convert the display system 10 from 3D to 2D mode are illustrated. In FIG. 5 the support 24 is shown having been moved from the stored orientation of FIG. 2 to extend laterally out from the support 21. Alternatively, if the support 24 was not installed and retained in stored orientation of FIG. 2, it may be installed in the support 21 to extend from the support in the manner illustrated in FIG. 5.

Figure 6:
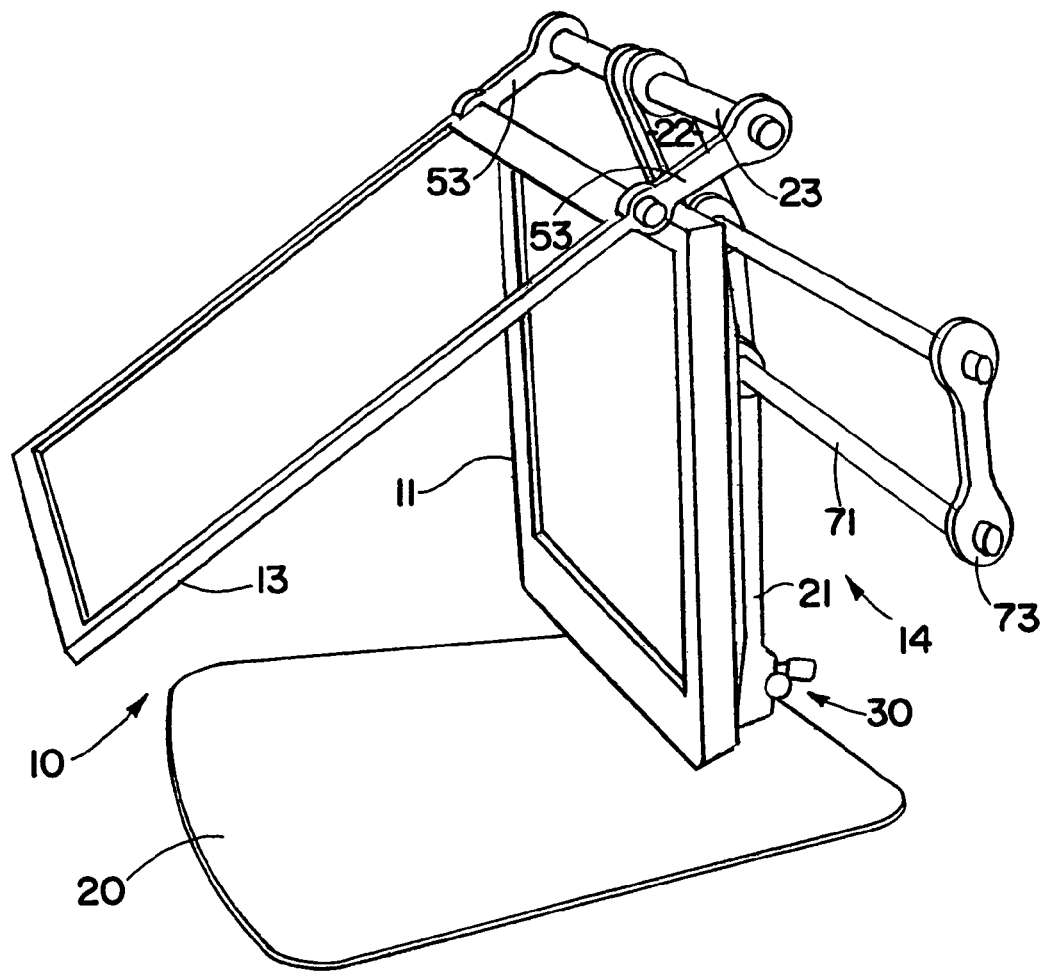

In FIG. 6 the display 12 has been removed. Such removal may be accomplished simply by lifting the display 12 off from the support 21 at the coupling 43. Depending on the length of electrical cable(s), e.g., shown at 12*c* in FIGS. 4, 6 and 8 (and for display 11 at 11*c* in FIG. 8) that provide signals and power to the display 12, it may be necessary to disconnect and to reconnect the cable(s) as the display 12 is manipulated. Part of that manipulation includes rotating the display 12 so that the top T thereof is in the same relative location to the bottom B thereof as is the relation of the top and bottom of the display 11 (sometimes referred to as "right side up"); see FIGS. 7 and 8, for example.

Figure 7:
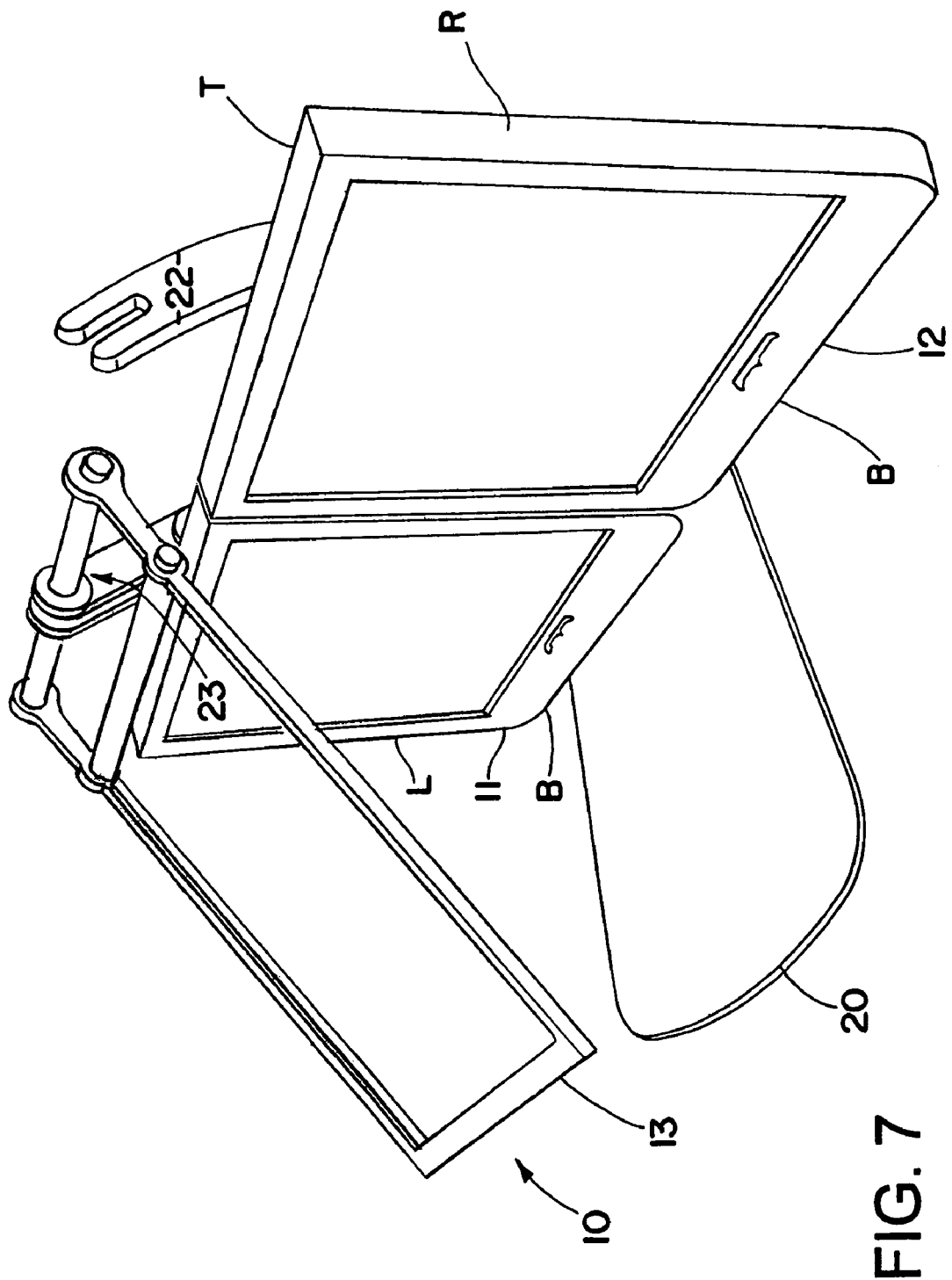
Figure 8:
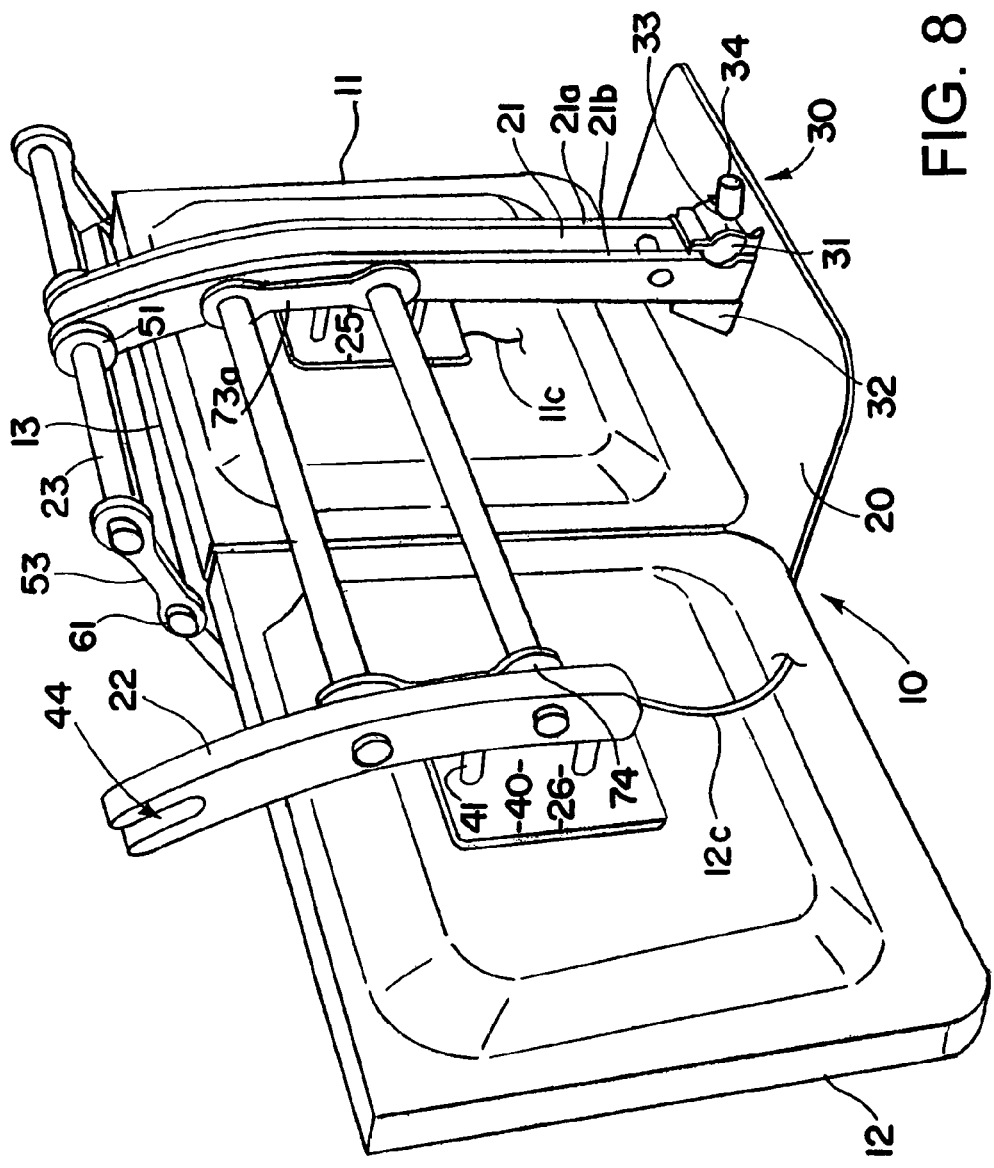

In FIGS. 7 and 8 the display 12 is shown having been installed on the support 24 adjacent the display 11 and in the same top to bottom orientation as the display 11. However, the beam splitter 13 still is in the viewing path to the display 12.

Referring briefly back to FIGS. 3 and 4, the manner in which the beam splitter 13 has been moved to storage orientation is illustrated. For example, to move the beam splitter from the orientation illustrated in FIG. 8 to the orientation illustrated in FIGS. 3 and 4, the screws 61 may be loosened, and the beam splitter may be rotated relative to the links 53, 54 so that the plane of the beam splitter is approximately perpendicular to the generally linear direction or axis of the links 53, 54. The screws 61 may be tightened then. The beam splitter 13 and links 53, 54 may be rotated about the support rod 23 or the support rod 23 itself may rotate in the retainers 51 (or with the retainers 51) and in the openings of the struts 21*a*, 21*b* of the support 21 through which the support rod 23 extends. Such rotating about the generally linear axis of the support rod 23 may be sufficient to rotate the beam splitter to a stored location of that illustrated in FIGS. 3 and 4 out of the way of and path for direct viewing of the displays 11, 12. The links 53, 54 provide a linear offset of the beam splitter 13 away from the support rod 23, as is illustrated in FIGS. 3 and 4, so that there is adequate space to store the beam splitter in the manner illustrated there without the beam splitter engaging the support 21 in a manner that might otherwise damage the beam splitter.

With the beam splitter out of the way and the displays 11, 12 positioned for direct viewing as in FIGS. 3 and 4, the display system 10 may be operated in 2D mode.

To convert or to adjust the display system 10 from the 2D mode of FIGS. 3 and 4 to the 3D mode of FIGS. 1 and 2, the beam splitter 13 may be rotated back to the orientation shown in FIGS. 7 and 8, for example. The display 12 may be removed from the support 24, shown in FIG. 4, rotated 180 degrees to place the bottom at the bottom and the top at the top of the display 12, and assembled with respect to the display 11 by placing part of the support 22 between the struts 21*a*, 21*b* while effecting a sliding action to place a part of the support rod 23 and the fastener 36 in the slot 44 to complete the coupling 43. The beam splitter 13 may be adjusted so that the plane thereof (or other reflecting portion thereof), and, in particular, the reflecting surface thereof, which reflects light from the display 12, is at the bisectrix of the angle between the displays, and the various screws and fasteners of the display system 10 may be tightened to maintain the positional orientation and relationship of the various parts as described.

Figure 9:
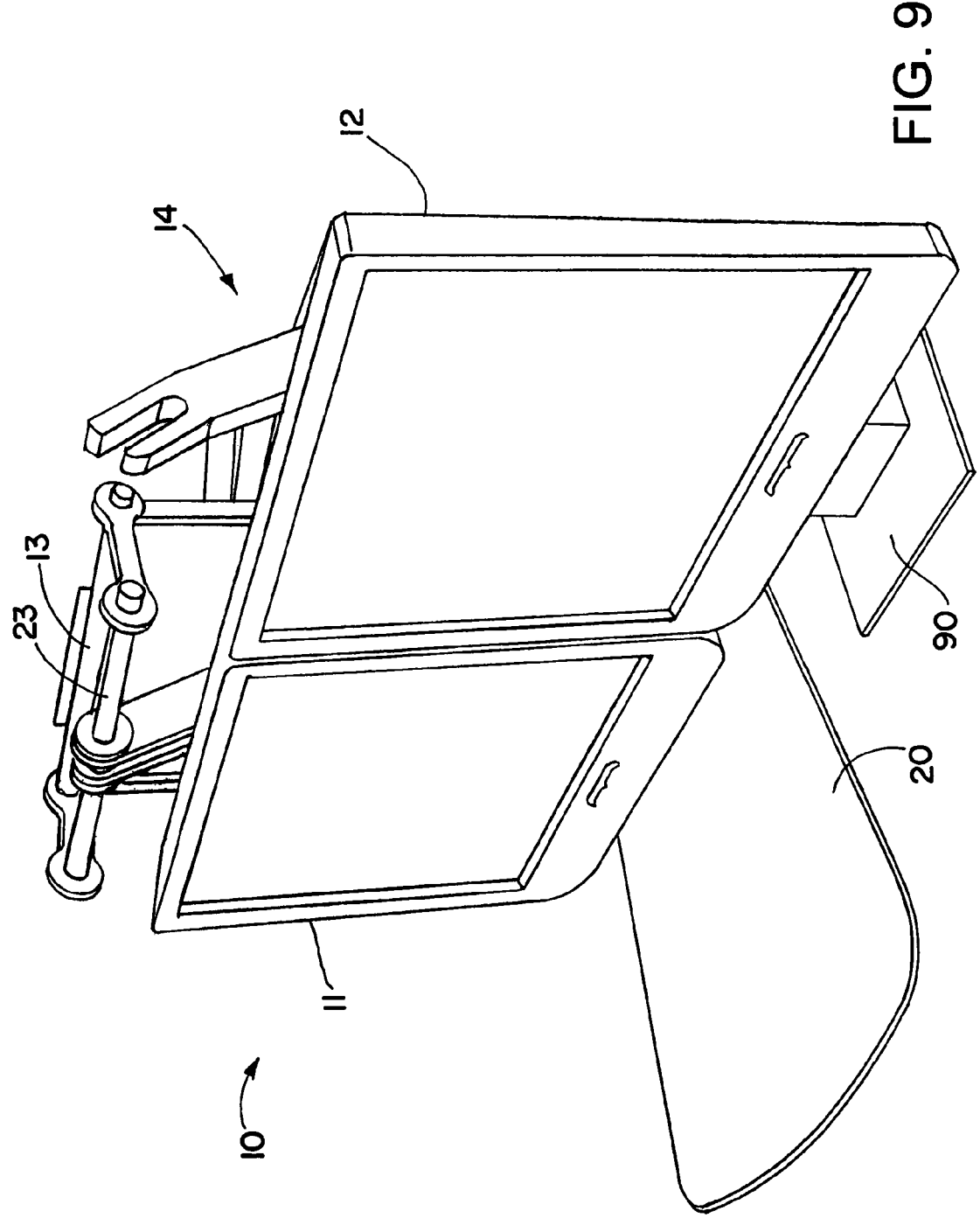
FIG. 9 is a view similar to FIG. 3 showing a separate foot support for one of the displays in the 2D mode.
Figure 15:
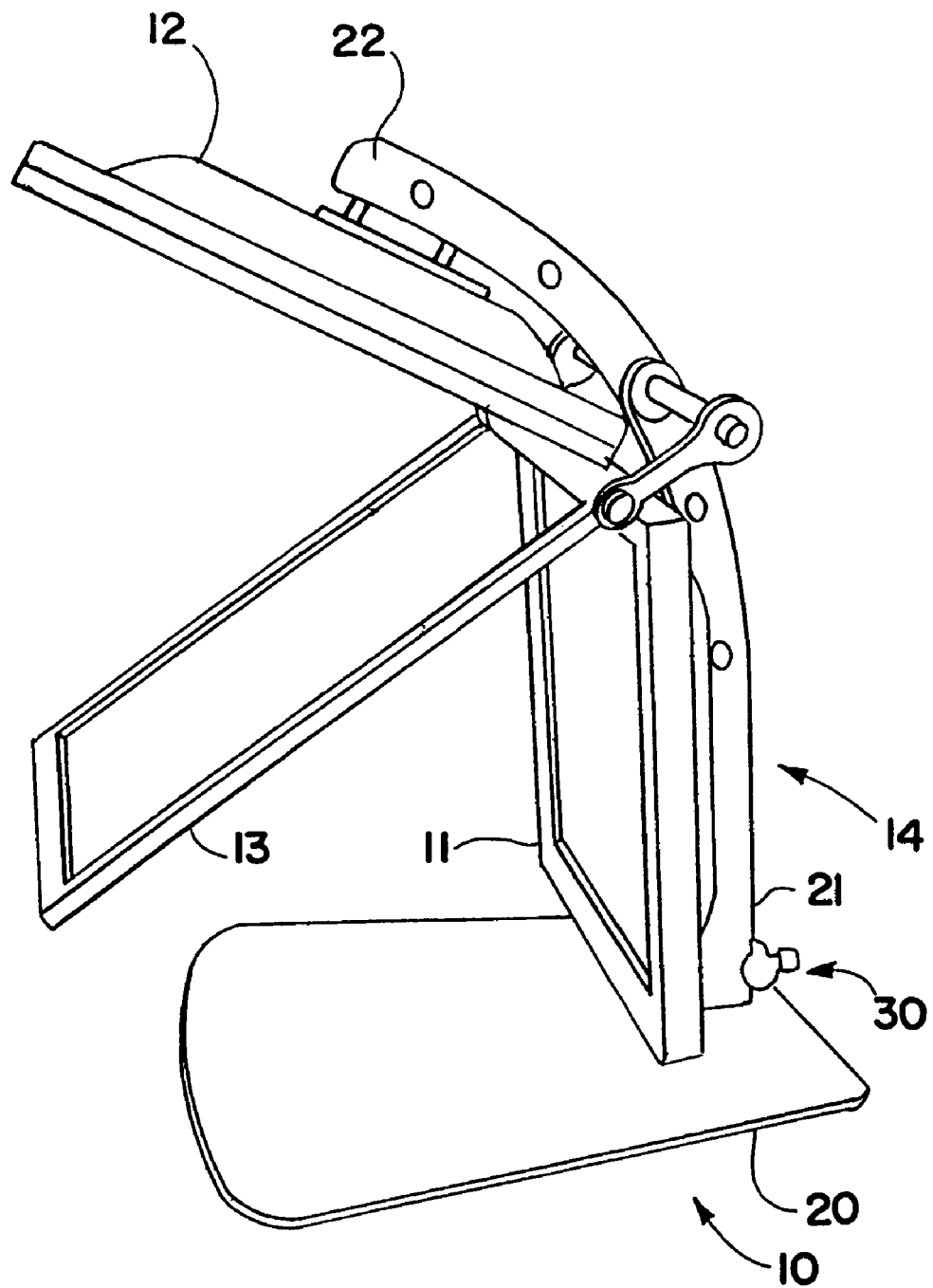
FIGS. 15 and 16 are the same as FIGS. 1 and 2 except are on a smaller scale to provide higher resolution.
Figure 16:
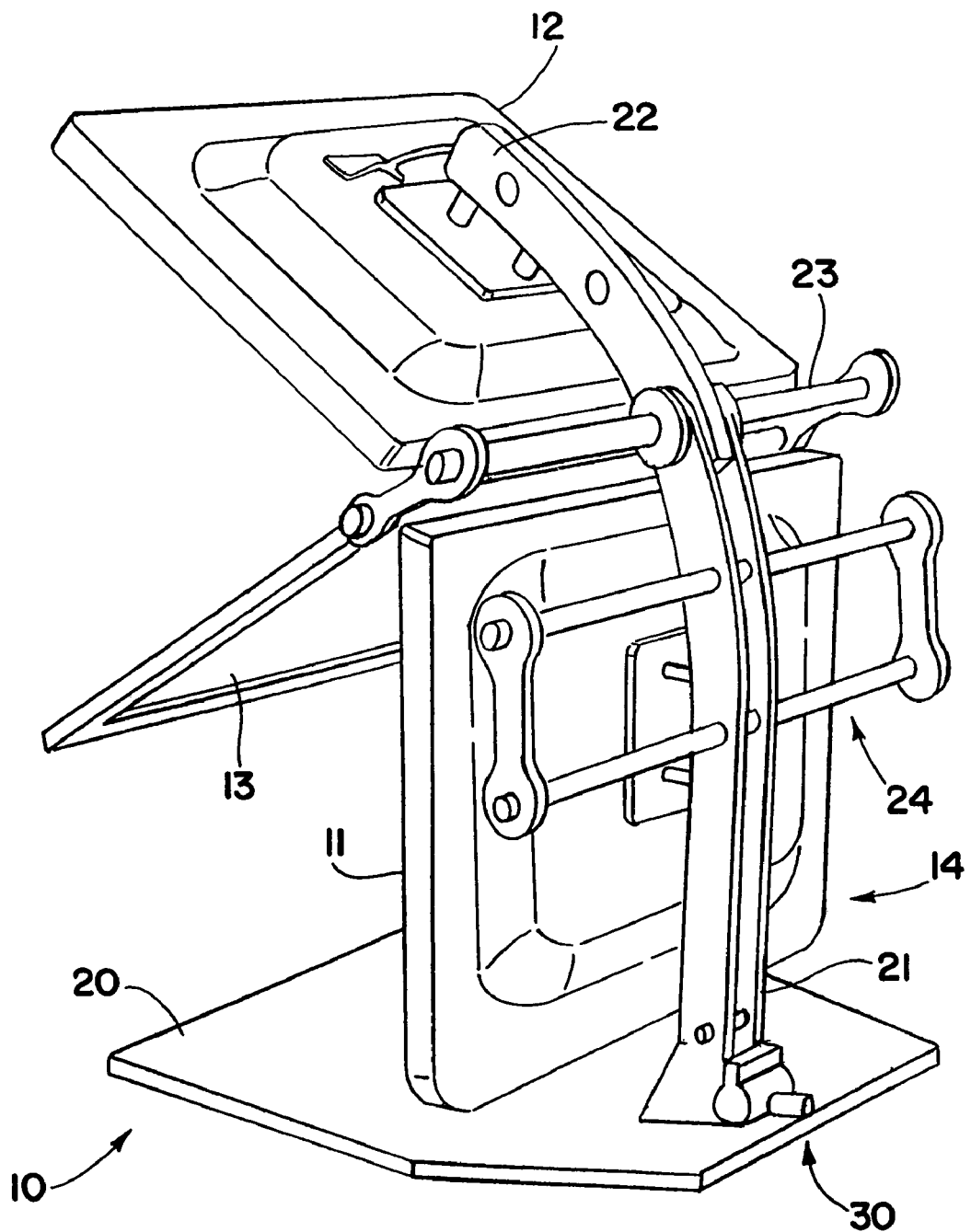
Figure 17:
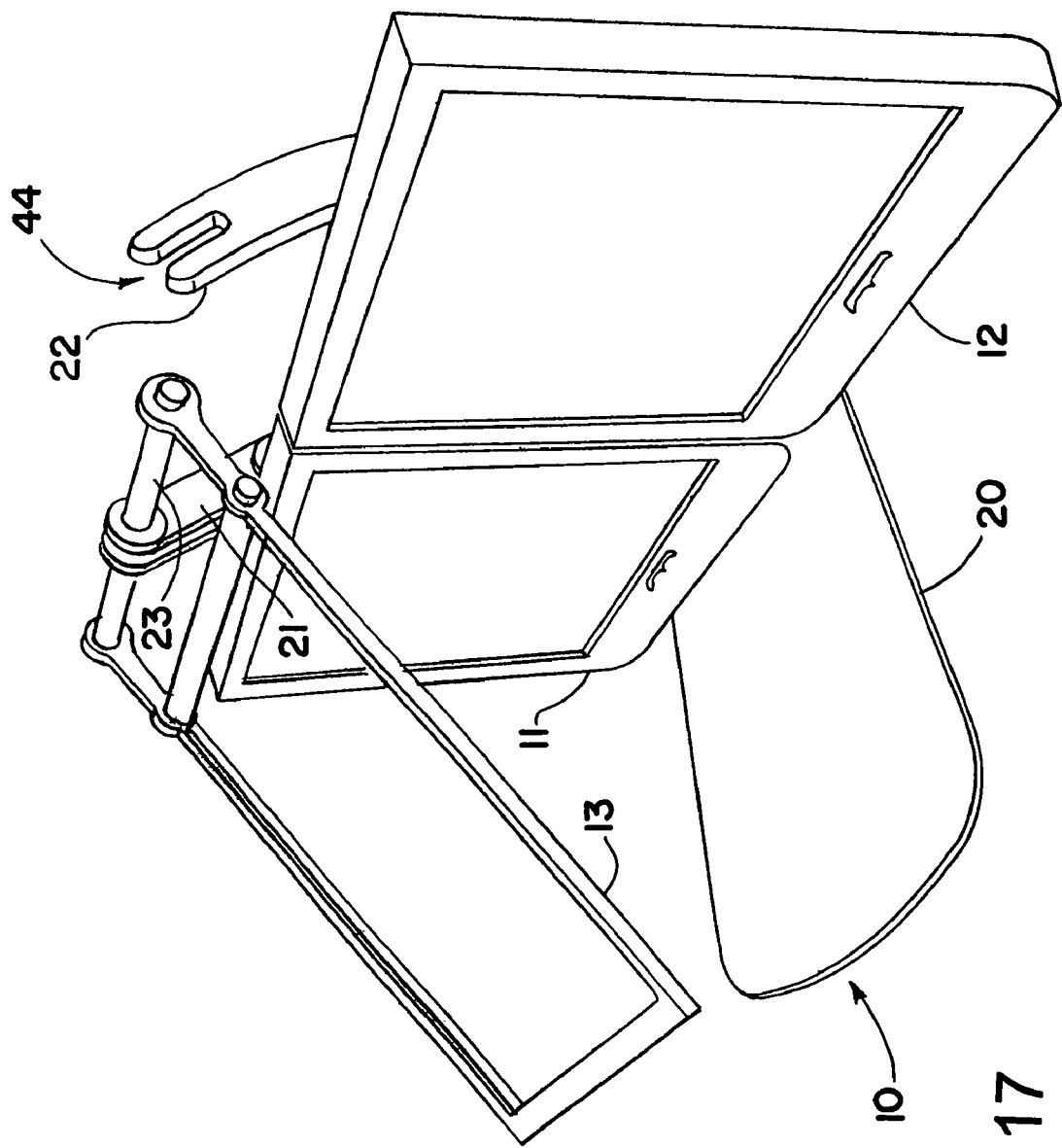
FIGS. 17 and 18 are the same as FIGS. 3 and 4 except are on a smaller scale to provide higher resolution.
Figure 18:
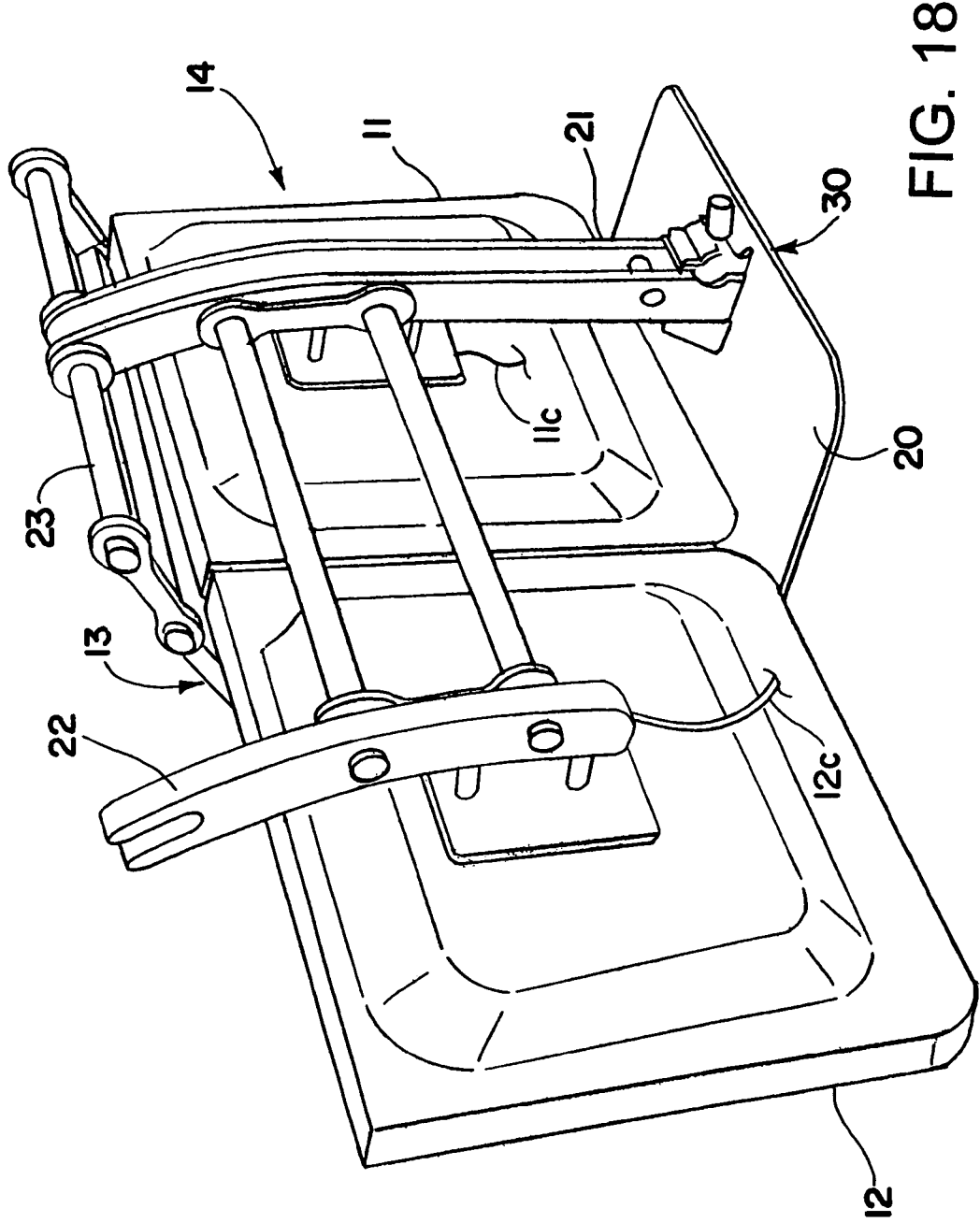

FIG. 9 is a view similar to FIG. 3 showing a separate foot 90 for the display 12 oriented in the 2D mode. The foot 90 helps to support the weight of display 12 while the rods 70, 71 of the support 24 also support the display 12 and maintain its position in proximity adjacent the display 11.

FIG. 10 is a schematic illustration showing the displays 11, 12 separate and apart from each other in an orientation for 2D mode of operation of the display system 10. In FIG. 10 the displays 11, 12 are shown in side-by-side relation although they are spaced apart from each other; they could be placed in virtually any other orientation, as may be desired, to provide the 2D mode of operation.

FIGS. 11 and 12 are front and side elevation schematic illustrations showing the displays 11, 12 in 2D mode in vertical orientation. The displays 11, 12 are retained relative to each other in proximity such that the top of the display 11 is adjacent to the bottom of the display 12. A fastening or securement bracket or other mechanism 91 is illustrated schematically to hold the displays 11, 12 in such vertically spaced apart position.

FIG. 13 schematically illustrates a display system 10 with an image drive circuit 92 to provide image data for display by the respective displays 11, 12. If the displays 11, 12 are operated in 2D mode, then conventional image data would be provided to the displays to show images thereon. The image data is provided by connection 93 to the display 11 and via a switch 94 and connection 94a to the display 12. If the displays are to be operated in 3D mode, then the image data to the display 12 is provided by the switch 94, a connection 94a and a data reversing circuit 95, which is provided to reverse or invert the image data provided to the display 12 in the manner described above. The switch 94 may be a mechanical switch, electronic switch, or some other switch device; it may be operated manually, electronically or otherwise to effect the switching function of directing the image data for the display 12 either directly to the display 12 or to the reversing circuit 95 and from there to the display 12. The reversing circuit 95 may be an electronic buffer circuit and/or some other electrical or electronic circuit and/or a software arrangement and associated operating circuitry, e.g., including a processor, etc., that receives the image data intended for the display 12 and reverses the direction of it so that when it is provided to the display 12 the image shown by the display represents the mirror image of the image that would be provided if the data were not inverted.

FIG. 14 illustrates an automated switch 94' associated with the image drive circuit 92 and reversing circuit 95. In FIG. 14 the switch 94' is an electrically controlled switch. A direction sensor 96 on the display 12 detects or senses the directional orientation of the display 12, e.g., is it right side up or up side down, respectively, for 2D or 3D mode of operation of the display system. The direction sensor 96 provides an input to the switch 94' to control its operation. Therefore, when the sensor 96 senses that the display 12 is in the right side up orientation with the top T thereof above the bottom B thereof so that the display would be intended for 2D mode of operation, then the sensor 96 automatically operates the switch 94' by an appropriate input from the sensor so image data from the image drive circuit 92 is provided directly to the display 12. However, if the sensor 96 senses that the display 12 is upside down for 3D mode of operation, then a signal is provided by the sensor 96 to the switch 94' to cause the image data for the display 12 to be directed via the reversing circuit 95 to the display 12.

INDUSTRIAL APPLICATION

It will be appreciated that the display system of the invention is a dual-mode display system that can be operated in respective 2D and 3D modes and can be converted from one of those modes to the other.

The invention claimed is:

1. A convertible display system, comprising a pair of displays, wherein each display has a normal top, a normal bottom, a left side, and a right side a beam splitter, and a mount, the mount, displays and beam splitter being cooperative selectively to orient the displays in a mode for substantially direct viewing, wherein the left side or right side of one display is adjacent to the left side or right side of another display, and to orient the displays in a mode for viewing, respectively, via reflection by and transmission through the beam splitter, wherein the normal top or normal bottom of one display is adjacent to the normal top or normal bottom of another display.

2. The system of claim 1, wherein light from the displays is polarized.

3. The system of claim 2, wherein light from the displays is polarized in the same direction relative to the top and bottom of the respective displays.

4. The system of claim 1, wherein the displays are the same.

5. The system of claim 1, wherein the displays are liquid crystal displays.

6. The system of claim 1, wherein each of the displays has a normal top and a normal bottom, and wherein the mount mounts the displays in the mode for viewing via reflection by and transmission through the beam splitter such that one of both tops of the displays or both bottoms of the displays are proximate each other and the other of both bottoms of the displays or both tops of the displays are relatively remote from each other.

7. The system of claim 1, wherein the mount includes at least one generally horizontal rod mounted relative to one of the displays and the other display includes a support with an opening for receiving the rod therein to support the other display in relatively side by side relation to the one of the displays.

8. The system of claim 7, wherein both displays include a respective support, and wherein the supports are interconnectible by a slot in one support and a member of the other support.

9. The system of claim 8, wherein at least one of the supports has walls for restraining movement of the other support when the member is in position in the slot.

10. The system of claim 8, wherein the displays are generally planar and with the supports interconnected by the slot and member, the displays are held relative position such that an extension of the respective planes intersect on a straight line.

11. The system of claim 8, further comprising walls associated with at least one of the slot and member, said walls being cooperative with at least one of the supports to hold the other support in fixed relation relative to the other support.

12. The system of claim 1, said mount being cooperative with the displays and beam splitter to mount the displays such that extensions of the planes of the displays and beam splitter intersect along a common line or axis with the displays oriented for viewing via reflection by and transmission through the beam splitter and with the beam splitter substantially at the bisectrix of the angle between the displays.

13. The system of claim 12, said mount including a rotatable support for rotating the beam splitter out of viewing path for viewing at least one of the displays.

14. The system of claim 13, said rotatable support including an articulated support member.

15. The system of claim 1, said mount being cooperable with the displays for mounting them such that both displays are supported from a single foot.

16. The system of claim 15, said mount being cooperable with the displays to provide for mounting of one of the displays in spaced apart relation from the other display such that one display is supported by such foot and the other display is supported by one or more rod-like members in spaced apart relation to the one display.

17. The system of claim 1, said mount being cooperable with the displays to provide for positioning of the displays in spaced apart relation such that one display is supported by a first foot and the other display is supported by a second foot.

18. The system of claim 17, said mount comprising one or more rod-like members for holding the displays in spaced apart relation.

19. The system of claim 1, said mount comprising a separate support for each display, and one or more support rods cooperative with the support of one display to support such display in side by side relation from the support of the other display.

20. The system of claim 19, further comprising a slide link on the one or more support rods for reinforcement thereof and/or of the connection with the display that is supported from the one or more support rods.

21. The system of claim 1, further comprising circuitry supplying image information to the respective displays.

22. The system of claim 21, said circuitry being operable to provide image information normal orientation to one display and in mirror image orientation to the other display.

23. The system of claim 22, said image information to the respective displays comprising respective stereo pairs.

24. The system of claim 22, wherein said circuitry comprises a separate circuit card.

25. The system of claim 22, wherein said circuitry comprises at least some circuitry built in the respective displays.

26. The system of claim 22, said circuitry comprising a switch to switch between providing image information to one display respectively in mirror image orientation for viewing of images from said one display via reflection from the beam splitter and in normal orientation for viewing of images directly from said one display without reflection by said beam splitter.

27. The system of claim 26, wherein operation of said switch is responsive to the positional relation of the displays.

28. The system of claim 1, wherein mount includes a separate foot supporting each respective display in 2D orientation.

29. The system of claim 1, said mount being cooperative with the displays to mount one display relatively above the other display.

30. The system of claim 29, said mount being operable to mount the displays such that the planes thereof form an angle from acute to obtuse and wherein the beam splitter is positioned at the bisectrix of the angle.

31. A method of converting a display system that has two displays, which are at least substantially the same, from an orientation to provide 2D image display use to an orientation to provide 3D image display use, wherein each display has a directional relation from the top to the bottom thereof and in the 2D orientation such directional relation is substantially the same during use, comprising rotating one display such that the directional orientation from the top to the bottom thereof is opposite the directional orientation from the top to the bottom of the other display, effecting relative positioning of the displays such that one of both the tops thereof or both the bottoms thereof are relatively adjacent.

32. A method of converting a display system that has two displays, which are at least substantially the same, from an orientation to provide 2D image display mode wherein the two component displays have the same directional orientation, for example the tops of both displays are oriented upwards, to a stereo 3D orientation mode, comprising rotating one display such that the directional orientation from the top to the bottom thereof is opposite the directional orientation from the top to the bottom of the other display, effecting relative positioning of the displays such that one of both the tops thereof or both the bottoms thereof are relatively adjacent.

33. A method of converting a display system that has two displays, which are at least substantially the same, from an orientation to provide stereo 3D image display use to an orientation to provide 2D image display use, wherein each display has a directional relation from the top to the bottom thereof and in the 3D orientation such directional relation is substantially the opposite during use, comprising rotating one display such that the directional orientation from the top to the bottom thereof is the same as the directional orientation from the top to the bottom of the other display, effecting relative positioning of the displays for at least substantially direct viewing.

34. A method of converting a display system that has two displays, which are at least substantially the same, from an orientation to provide 2D image display use to an orientation to provide 3D image display use, wherein each display has a directional relation from the top to the bottom thereof and in the 2D orientation such directional relation is substantially the same during use, and from an orientation to provide 3D image display use to an orientation to provide 2D image display use, wherein each display has a directional relation from the top to the bottom thereof and in the 3D orientation such directional relation is substantially the opposite during use, comprising determining the current orientation of the displays for the associated use, and to convert from 2D to 3D orientation rotating one display such that the directional orientation from the top to the bottom thereof is opposite the directional orientation from the top to the bottom of the other display, and effecting relative positioning of the displays such that one of both the tops thereof or both the bottoms thereof are relatively adjacent, and to convert from 3D to 2D orientation rotating one display such that the directional orientation from the top to the bottom thereof is the same as the directional orientation from the top to the bottom of the other display, and effecting relative positioning of the displays for at least substantially direct viewing.

35. A method of converting a convertible display system as set forth in claim 1, wherein the displays are mounted such that they form an angle therebetween, the beam splitter can be deployed so as to bisect the angle between the two displays in the 3D mode and be substantially hidden from view behind at least one of the two displays in the 2D mode wherein the deployment of the beam splitter when converting from the 2D mode to the 3D mode is an integrated step in the process of rotating and translating the position of the first display and likewise is an integrated step to stow the beam splitter in converting the display back to the 2D mode.

36. The method of claim 35, including converting the electronic scan of the rotated display between a conventional scan in the 2D mode to a reverse scan in the stereo 3D mode.

* * * * *